United States Patent
Noh et al.

(10) Patent No.: US 11,870,731 B2
(45) Date of Patent: Jan. 9, 2024

(54) METHOD AND DEVICE FOR TRANSMITTING/RECEIVING UPLINK REFERENCE SIGNAL OR CHANNEL IN WIRELESS COMMUNICATION SYSTEM

(71) Applicant: Samsung Electronics Co., Ltd., Gyeonggi-do (KR)

(72) Inventors: Hoon-dong Noh, Gyeonggi-do (KR); Young-woo Kwak, Gyeonggi-do (KR); Cheol-kyu Shin, Gyeongg-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/754,923

(22) PCT Filed: Oct. 23, 2018

(86) PCT No.: PCT/KR2018/012582
§ 371 (c)(1),
(2) Date: Apr. 9, 2020

(87) PCT Pub. No.: WO2019/083260
PCT Pub. Date: May 2, 2019

(65) Prior Publication Data
US 2020/0313827 A1    Oct. 1, 2020

(30) Foreign Application Priority Data
Oct. 23, 2017    (KR) .................... 10-2017-0137370

(51) Int. Cl.
*H04L 5/00* (2006.01)
*H04W 72/044* (2023.01)
*H04W 72/23* (2023.01)

(52) U.S. Cl.
CPC .......... *H04L 5/0057* (2013.01); *H04L 5/0023* (2013.01); *H04L 5/0094* (2013.01); *H04W 72/046* (2013.01); *H04W 72/23* (2023.01)

(58) Field of Classification Search
CPC ... H04L 5/0023; H04L 5/0057; H04L 5/0094; H04W 72/042; H04W 72/046
See application file for complete search history.

(56) References Cited

U.S. PATENT DOCUMENTS

| 9,392,639 B2 | 7/2016 | Josiam et al. |
| 2014/0071952 A1 | 3/2014 | Kim et al. |

(Continued)

FOREIGN PATENT DOCUMENTS

| KR | 1020140107117 | 9/2014 |
| KR | 1020180022071 | 3/2018 |

(Continued)

OTHER PUBLICATIONS

Huawei, HiSilicon, "Beam Indication for Control and Data Channels," R1-1715585 3GPP TSG RAN WG1 NR Ad-Hoc#3, Nagoya, Japan, Sep. 18-21, 2017, 8 pages. (Year: 2017).*

(Continued)

*Primary Examiner* — David B Lugo
(74) *Attorney, Agent, or Firm* — The Farrell Law Firm, P.C.

(57) ABSTRACT

The disclosure relates to a wireless communication system, in which a method of transmitting an uplink reference signal or channel, according to an embodiment, includes receiving, from a base station, information about a direction of a beam to be used for transmission of the uplink reference signal or channel; performing beamforming on the uplink reference signal or channel based on the information about the direction of the beam; and transmitting the beamformed uplink reference signal or channel to the base station.

10 Claims, 19 Drawing Sheets

(56) References Cited

U.S. PATENT DOCUMENTS

| | | | |
|---|---|---|---|
| 2016/0087705 A1* | 3/2016 | Guey | H04L 5/0053 |
| | | | 370/336 |
| 2017/0214442 A1 | 7/2017 | Chae et al. | |
| 2018/0110066 A1* | 4/2018 | Luo | H04W 72/0413 |
| 2019/0103908 A1* | 4/2019 | Yu | H04B 7/0851 |
| 2019/0132850 A1* | 5/2019 | Sun | H04W 74/0833 |
| 2019/0199417 A1 | 6/2019 | Noh et al. | |
| 2020/0178280 A1* | 6/2020 | Guan | H04B 7/088 |
| 2020/0220582 A1* | 7/2020 | Wu | H04L 1/18 |
| 2020/0252241 A1* | 8/2020 | Park | H04B 1/713 |
| 2020/0288482 A1* | 9/2020 | Yi | H04W 72/1278 |
| 2020/0304256 A1* | 9/2020 | Park | H04L 5/0053 |

FOREIGN PATENT DOCUMENTS

| | | |
|---|---|---|
| WO | WO 2017/027055 | 2/2017 |
| WO | WO 2017/107054 | 6/2017 |
| WO | WO 2017/177459 | 10/2017 |

OTHER PUBLICATIONS

LG Electronics, "Discussion on non-codebook based Transmission for UL", R1-1717937, 3GPP TSG RAN WG1 Meeting #90bis, Oct. 9-13, 2017, 3 pages.

Huawei, HiSilicon, "UL SRS Design for Beam Management and CSI Acquisition", R1-1717307, 3GPP TSG RAN WG1 Meeting #90bis, Oct. 9-13, 2017, 13 pages.

International Search Report dated Jan. 25, 2019 issued in counterpart application No. PCT/KR2018/012582, 19 pages.

Samsung, "Discussion on Beam Indication for UL Transmission", R1-1717620, 3GPP TSG RAN WG1 Meeting 90bis, Oct. 9-13, 2017, 6 pages.

CATT, "Consideration on Beam Management", R1-1717812, 3GPP TSG RAN WG1 Meeting 90bis, Oct. 9-13, 2017, 10 pages.

European Search Report dated Sep. 25, 2020 issued in counterpart application No. 18869983.9-1220, 8 pages.

Korean Office Action dated May 17, 2021 issued in counterpart application No. 10-2017-0137370, 9 pages.

Chinese Office Action dated Oct. 9, 2021 issued in counterpart application No. 201880069040.8, 21 pages.

Korean Office Action dated Sep. 2, 2021 issued in counterpart application No. 10-2017-0137370, 8 pages.

Korean Office Action dated Mar. 7, 2022 issued in counterpart application No. 10-2017-0137370, 7 pages.

Chinese Office Action dated Mar. 23, 2022 issued in counterpart application No. 201880069040.8, 17 pages.

Korean Office Action dated Apr. 27, 2022 issued in counterpart application No. 10-2017-0137370, 6 pages.

Indian Examination Report dated Apr. 28, 2022 issued in counterpart application No. 202037014168, 6 pages.

Korean Office Action dated Aug. 2, 2022 issued in counterpart application No. 10-2022-0086538, 8 pages.

Chinese Office Action dated Jun. 22, 2022 issued in counterpart application No. 201880069040.8, 14 pages.

European Search Report dated Mar. 27, 2023 issued in counterpart application No. 18869983.9-1206, 6 pages.

KR Notice of Allowance dated Feb. 22, 2023 issued in counterpart application No. 10-2022-0086538, 6 pages.

* cited by examiner

————: RELATIONSHIP THAT IS INDICATED BY DCI OR MAC CE
- - - -: RELATIONSHIP THAT IS NOT INDICATED BY DCI OR MAC CE

- - - - - - : RELATIONSHIP #1 THAT IS INDICATED BY DCI OR MAC CE
─────── : RELATIONSHIP #2 THAT IS INDICATED BY DCI OR MAC CE
— — — : RELATIONSHIP THAT IS NOT INDICATED BY DCI OR MAC CE

CODE POINT 00: NON-PRECODED SRS (RESOURCE #1)
CODE POINT 01: SRS RESOURCE #2 -> DL REFERENCE SIGNAL WITH LARGEST RSRP
CODE POINT 10: SRS RESOURCE #3 -> DL REFERENCE SIGNAL WITH SECOND LARGEST RSRP
CODE POINT 11: SRS RESOURCE #4 -> DL REFERENCE SIGNAL WITH THIRD LARGEST RSRP
...

METHOD AND DEVICE FOR TRANSMITTING/RECEIVING UPLINK REFERENCE SIGNAL OR CHANNEL IN WIRELESS COMMUNICATION SYSTEM

PRIORITY

This application is a National Phase Entry of PCT International Application No. PCT/KR2018/012582 which was filed on Oct. 23, 2018, and claims priority to Korean Patent Application No. 10-2017-0137370, which was filed on Oct. 23, 2017, the content of each of which is incorporated herein by reference.

TECHNICAL FIELD

The disclosure relates to a wireless communication system, and more particularly, to a method of transmitting and receiving an uplink reference signal or channel to smoothly provide services in a wireless communication system.

BACKGROUND ART

To meet the increase in demand with respect to wireless data traffic after the commercialization of 4G communication systems, considerable efforts have been made to develop improved 5G communication systems or pre-5G communication systems. This is one reason why '5G communication systems' or 'pre-5G communication systems' are called 'beyond 4G network communication systems' or 'post Long Term Evolution (LTE) systems'. In order to achieve a high data rate, 5G communication systems are being developed to be implemented in a super-high frequency band (millimeter wave (mmWave)), e.g., a band of 60 GHz. In order to reduce path loss in such a super-high frequency band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects, thereby creating new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using beamforming, MIMO, array antennas, etc. Application of a cloud RAN as the above-described big data processing technology may be an example of convergence of the 5G technology and the IoT technology.

As various services can be provided according to the above-described technologies and the development of wireless communication systems, there is a demand for smoothly providing such services.

DESCRIPTION OF EMBODIMENTS

Technical Problem

Embodiments of the disclosure may provide a method and apparatus for transmitting and receiving an uplink reference signal or channel to effectively provide services in a wireless communication system.

Solution to Problem

According to an embodiment, a method, performed by a user equipment, of transmitting an uplink reference signal or channel in a wireless communication system may include receiving, from a base station, information about a direction of a beam to be used for transmission of the uplink reference signal or channel; performing beamforming on the uplink reference signal or channel based on the information about the direction of the beam; and transmitting the beamformed uplink reference signal or channel to the base station.

According to an embodiment, a method, performed by a base station, of receiving an uplink reference signal or channel in a wireless communication system may include transmitting, to a user equipment, information about a direction of a beam to be used for transmission of the uplink reference signal or channel; and receiving, from the user equipment, the uplink reference signal or channel in the direction of the beam.

According to an embodiment, a user equipment for transmitting an uplink reference signal or channel in a wireless communication system may include a communicator; at least one memory storing a program to transmit the uplink reference signal or channel; and at least one processor, by performing the program, configured to receive, from a base station, information about a direction of a beam to be used for transmission of the uplink reference signal or channel, perform beamforming on the uplink reference signal or channel based on the information about the direction of the beam, and transmit the beamformed uplink reference signal or channel to the base station.

According to an embodiment, a base station for receiving an uplink reference signal or channel in a wireless communication system may include a communicator; at least one memory storing a program to receive the uplink reference signal or channel; and a processor, by performing the program, configured to transmit, to a user equipment, information about a direction of a beam to be used for transmission of the uplink reference signal or channel, and receive the uplink reference signal or channel from the user equipment in the configured direction of the beam.

Advantageous Effects of Disclosure

Embodiments of the disclosure may effectively provide services in a wireless communication system.

BEST MODE

Figure 1:
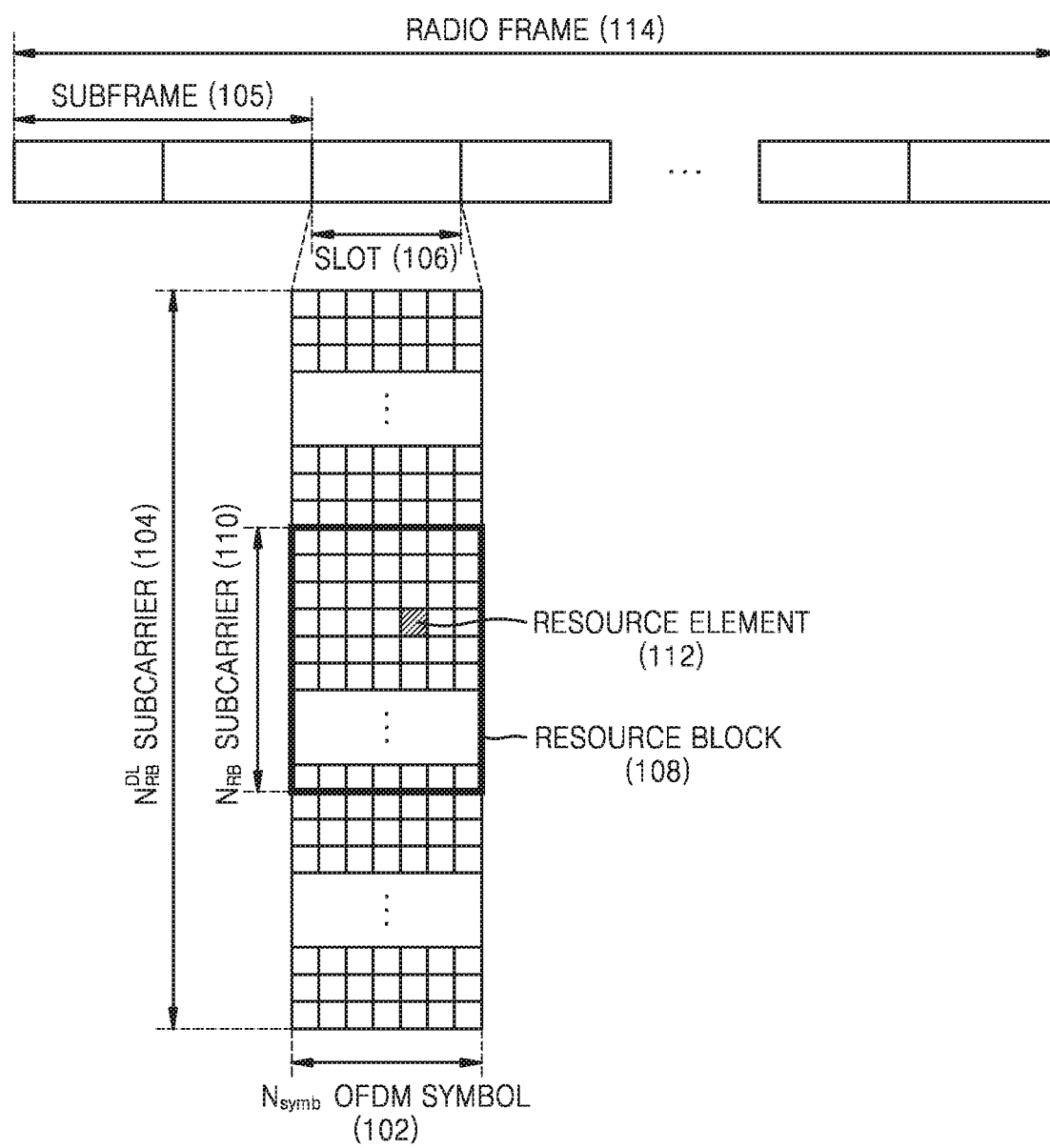
FIG. 1 illustrates a transmission structure of a time-frequency domain that is a downlink wireless resource area of an LTE, LTE-A, or a system similar thereto.

According to an embodiment, a method, performed by a user equipment, of transmitting an uplink reference signal or channel in a wireless communication system includes receiving, from a base station, information about a direction of a beam to be used for transmission of an uplink reference signal or channel, performing beamforming on the uplink reference signal or channel based on the information about the direction of the beam, and transmitting the beamformed uplink reference signal or channel to the base station.

In an embodiment, the information about the direction of the beam may include information about a first relationship between at least one downlink reference signal or channel and at least one uplink reference signal or channel corresponding thereto or information about a second relationship between at least one first uplink reference signal or channel and at least one second uplink reference signal or channel.

In an embodiment, the performing of beamforming on the uplink reference signal or channel based on the information about the direction of the beam may include receiving indication information indicating whether to perform the beamforming on the uplink reference signal or channel based on the information about the first relationship or the information about the second relationship, and performing the beamforming based on the indication information.

In an embodiment, the information about the first relationship may include information about at least one of a relationship between the at least one downlink reference signal and the at least one uplink reference signal or channel corresponding thereto and a relationship between the at least one downlink channel and the at least one uplink reference signal or channel corresponding thereto, and the information about the second relationship may include information about at least one of a relationship between the at least one first uplink reference signal and the at least one second uplink reference signal or channel and a relationship between the at least one uplink channel and the at least one second uplink reference signal or channel.

In an embodiment, the information about the first relationship may include information about a relationship between each resource allocated to the at least one downlink (DL) reference signal or channel or each port group in each resource allocated to the at least one DL reference signal or channel and each resource allocated to the at least one uplink (UL) reference signal or channel or each port group in each resource allocated to the at least one UL reference signal or channel corresponding thereto, and the information about the second relationship may include information about a relationship between each resource allocated to the at least one first UL reference signal or channel or each port group in each resource allocated to the at least one first UL reference signal or channel and each resource allocated to the at least one UL reference signal or channel or each port group in each resource allocated to the at least one UL reference signal or channel corresponding thereto.

In an embodiment, the information about the direction of the beam may include direction information of an indicator or channel indicating the direction of a beam to be used for the transmission of the uplink reference signal or channel.

In an embodiment, the performing of the beamforming on the UL reference signal or channel based on the information about the direction of a beam may include performing the beamforming for each resource allocated to the at least one the UL reference signal or channel or for each port group in each resource, based on the direction information of the indicator or the channel, and the port group may correspond to the port of at least one UL reference signal or channel.

In an embodiment, the UL reference signal may be a periodic or semi-persistent reference signal, and the transmitting of the beamformed UL reference signal or channel to the base station may include transmitting the UL reference signal beamformed in a different direction at each UL reference signal transmission time.

According to an embodiment, a method, performed by a base station, of receiving an uplink reference signal or channel in a wireless communication system includes transmitting, to a user equipment, information about a direction of a beam to be used for transmission of an uplink reference signal or channel, and receiving, from the user equipment, the uplink reference signal or channel in the direction of the beam.

In an embodiment, the transmitting, to the user equipment, of the information about the direction of the beam to be used for the transmission of the uplink reference signal or channel may include configuring at least some of resources allocated to the uplink reference signal or channel to be deactivated, and transmitting the information about the deactivated resources to the user equipment.

In an embodiment, the transmitting, to the user equipment, of the information about the direction of a beam to be used for the transmission of a UL reference signal or channel may include configuring a reference point based on channel status information previously received from the user equipment, and transmitting, to the user equipment, the information about the direction of a beam by using the reference point and a difference value from the reference point.

In an embodiment, the transmitting, to the user equipment, of the information about the direction of the beam to be used for the transmission of the uplink reference signal or channel may include transmitting a downlink reference signal, and changing the information about the direction of the beam based on a report from the user equipment regarding the downlink reference signal.

According to an embodiment, a user equipment for transmitting an uplink reference signal or channel in a wireless communication system includes a communicator, at least one memory storing a program to transmit an uplink reference signal or channel, and at least one processor, by performing the program, configured to receive, from a base station, information about a direction of a beam to be used for transmission of an uplink reference signal or channel, perform beamforming on the uplink reference signal or channel based on the information about the direction of the beam, and transmit the beamformed uplink reference signal or channel to the base station.

In an embodiment, the information about the direction of a beam may include information about a first relationship between at least one downlink reference signal or channel and at least one uplink reference signal or channel corresponding thereto or information about a second relationship between at least one first uplink reference signal or channel and at least one second uplink reference signal or channel.

In an embodiment, the at least one processor may receive indication information indicating whether to perform the beamforming on the uplink reference signal or channel based on the information about the first relationship or the information about the second relationship, and perform the beamforming based on the indication information.

In an embodiment, the information about the first relationship may include information about at least one of a relationship between the at least one downlink reference signal and the at least one uplink reference signal or channel corresponding thereto and a relationship between the at least one downlink channel and the at least one uplink reference signal or channel corresponding thereto, and the information about the second relationship may include information about at least one of a relationship between the at least one first uplink reference signal and the at least one second uplink reference signal or channel and a relationship between the at least one uplink channel and the at least one second uplink reference signal or channel.

In an embodiment, the information about the first relationship may include information about a relationship between each resource allocated to the at least one DL reference signal or each port group in each resource allocated to the at least one DL reference signal and each resource allocated to the at least one UL reference signal or channel or each port group in each resource allocated to the at least one UL reference signal or channel corresponding thereto, and the information about the second relationship may include information about a relationship between each resource allocated to the at least one first UL reference signal or channel or each port group in each resource allocated to the at least one first UL reference signal or channel and each resource allocated to the at least one UL reference signal or channel or each port group in each resource allocated to the at least one UL reference signal or channel corresponding thereto.

In an embodiment, the at least one processor may receive direction information of an indicator or channel indicating beam direction information to be used for the transmission of an uplink reference signal or channel.

In an embodiment, the at least one processor may perform the beamforming for each resource allocated to the at least one the UL reference signal or channel or for each port group in each resource, based on the direction information of the indicator or the channel, and the port group may correspond to the port of at least one UL reference signal or channel.

In an embodiment, the UL reference signal may be a periodic or semi-persistent reference signal, and the at least one processor may transmit the UL reference signal or channel beamformed in a different direction at each UL reference signal transmission time.

According to an embodiment, a base station for receiving an uplink reference signal or channel in a wireless communication system includes a communicator, at least one memory storing a program to receive an uplink reference signal or channel, and a processor, by performing the program, configured to transmit, to a user equipment, information about a direction of a beam to be used for transmission of an uplink reference signal or channel, and receive the uplink reference signal or channel from the user equipment in the configured direction of the beam.

In an embodiment, the at least one processor may configure at least some of resources allocated to the uplink reference signal or channel to be deactivated, and transmit the information about the deactivated resources to the user equipment.

In an embodiment, the at least one processor may configure a reference point based on channel status information received from the user equipment, and may transmit the information about the direction of a beam to the user equipment by using the reference point and a difference value from the reference point.

In an embodiment, the at least one processor may transmit a DL reference signal, and change the information about the direction of a beam based on a report from the user equipment regarding the DL reference signal.

Mode of Disclosure

Hereinafter, the disclosure will be described in detail by explaining embodiments of the disclosure with reference to the attached drawings.

In the description of an embodiment, the description of a technology that is well known in the technical field to which the disclosure belongs and does not have direct relation to the disclosure is omitted. This is to more clearly convey the subject matter of the disclosure without obscuring by omitting unnecessary explanations.

For the same reason, some elements illustrated in the drawings may be exaggerated, omitted, or schematically illustrated for convenience of explanation and clarity. Furthermore, the size of each element does not substantially reflect its actual size. Like reference numerals refer to like or corresponding elements in each drawing.

The advantages and features of the disclosure, and methods of achieving the same, will become apparent with reference to the embodiments described below in detail in conjunction with the accompanying drawings. However, the disclosure is not limited to the embodiments disclosed below, but may be embodied in different forms, the embodiments are provided to enable a complete disclosure and to fully convey the scope of the disclosure to those skilled in the art, and the disclosure may be defined by the scope of the claims. Like reference numerals refer to like elements throughout the specification.

In this case, it will be appreciated that each block of the flowchart illustrations and combinations of flowchart illustrations may be performed by computer program instructions. These computer program instructions may be mounted on a processor of a general purpose computer, special purpose computer, or other programmable data processing equipment, so that the instructions executed by the processor of the computer or other programmable data processing equipment generate a means for performing the functions described in the flowchart block(s). These computer program instructions can be stored in a computer usable or computer readable memory that intends a computer or other programmable data processing equipment to implement a function in a specific method, and thus the instructions stored in the computer usable or computer readable memory may produce a manufacture product including instructions means performing the function described in the flowchart block(s). As the computer program instructions can be mounted on the computer or other programmable data processing equipment, by generating a process executable by a computer by performing a series of operation steps on the computer or other programmable data processing equipment, the instructions performing the computer or other programmable data processing equipment may provide operations to execute the functions described in the flowchart block(s).

Furthermore, each block may represent a portion of a module, a segment, or a code that includes one or more executable instructions for executing a specified logical function(s). Also, it should be noted that in some alternative implementations, the functions noted in the blocks may occur out of order. For example, the two blocks shown in succession may be executed substantially concurrently, or the blocks may sometimes be executed in the reverse order, depending on the corresponding function.

In this case, the term '-part' used in the present embodiment refers to software or a hardware component such as a field programmable gate array (FPGA) or an application specific integrated circuit (ASIC), and '-part' performs certain roles. However, '-part' is not meant to be limited to software or hardware. '-part' may be configured to be present in an addressable storage medium or may be configured to play one or more processors. Accordingly, as an example, '-part' means components such as software components, object-oriented software components, class components, and task components, and processes, functions, properties, procedures, subroutines, segments of a program code, drivers, firmware, microcode, circuits, data, databases, data structures, tables, arrays, and variables. Functions provided within components and '-parts' may be combined into a smaller number of components and '-parts' or further separated into additional components and '-parts'. In addition, the components and '-parts' may be implemented to play one or more CPUs in a device or secure multimedia card. Furthermore, in an embodiment, '-part' may include one or more processors.

Wireless communication systems have developed from the initial form of providing a voice-oriented service, to broadband wireless communication systems capable of providing high-speed, high-quality packet data services, for example, high speed packet access (HSPA), long term evolution (LTE) or evolved universal terrestrial radio access (E-UTRA), LTE-advanced (LTE-A) of 3GPP, high rate packet data (HRPD), ultra mobile broadband (UMB), and communication standards such as IEEE's 802.16e of 3GPP2. Furthermore, 5G or new radio (NR) communication standards have been made as a 5G wireless communication system.

A representative example of the broadband wireless communication system includes, in an LTE system, an orthogonal frequency division multiplexing (OFDM) method in downlink (DL) and a single carrier frequency division multiple access (SC-FDMA) method in uplink (UL). Uplink refers to a wireless link through which a terminal such as a user equipment (UE) or a mobile station (the MS) transmits data or control signals to a base station (eNode B or BS). Downlink refers to a wireless link through which a terminal transmits data or control signals to the UE. In a multiple access method as described above, data or control information of each user can be divided by allocating and operating time-frequency resources to carry data or control information for each user not to overlap each other, that is, orthogonality is established.

The LTE system employs a hybrid automatic repeat request (HARQ) method that retransmits the corresponding data in the physical layer when a decoding failure occurs in the initial transmission. In the HARQ method, when a receiver fails to correctly decode data, the receiver transmits information (negative acknowledgement (NACK)) informing the transmitter of a decoding failure so that the transmitter can retransmit the corresponding data in the physical layer. The receiver combines the data retransmitted by the transmitter with the previously decoding failure data, thereby improving data reception performance. Furthermore, when the receiver correctly decodes the data, the receiver may transmit information (acknowledgment (ACK)) informing the transmitter of a decoding success, thereby enabling the transmitter to transmit new data.

The terms to be described below are terms defined in consideration of functions in the disclosure, which may vary depending on a user or operator's intention or practice. Therefore, the definition should be made based on the contents throughout the specification. In the following description, Base Station, as a subject performing resource allocation of a terminal, may refer to at least one of gNode B, eNode B, Node B, BS, a wireless connection unit, a BS controller, or a node on a network. The terminal may include the UE, the MS, a cellular phone, a smartphone, a computer, or a multimedia system capable of performing a communication function. In the disclosure, DL denotes a wireless transmission path of a signal transmitted by BS to the UE, and UL denotes a wireless transmission path of a signal transmitted by the UE to the BS. Furthermore, although in the following description an embodiment of the disclosure is described by using an LTE or LTE-A system as an example, the embodiment of the disclosure may be applied to other communication systems having a similar technical background or channel form. For example, the embodiment of the disclosure may include 5G mobile communication technologies (5G, new radio, NR) developed after LTE-A. Furthermore, the embodiment of the disclosure may be applied to other communication systems through partial deformation within a range of being deviated not much from the scope of the disclosure according to the determination by one having ordinary skill in the art.

To describe the method and apparatus proposed in the disclosure, terms such as a physical channel and a signal in a LTE or LTE-A system according to the related art may be used. However, the contents of the disclosure may be applied to a wireless communication system, not to the LTE and LTE-A system.

Furthermore, the contents of the disclosure may be applied to an FDD and TDD system.

In the following description according to the disclosure, physical layer signaling is a signal transmission method in which signals are transmitted from the BS to the UE by using a DL control channel of a physical layer, or from the UE to the BS by using a UL control channel of a physical layer, and may be referred to as L1 signaling or PHY signaling.

In the following description according to the disclosure, higher signaling or higher layer signaling is a signal transmission method in which signals are transmitted from the BS to the UE by using a DL data channel of a physical layer, or from the UE to the BS by using a UL data channel of a physical layer, and may be referred to as RRC signaling, L2 signaling, PDCP signaling, or MAC control element (MAC CE).

In the following description according to the disclosure, TPMI denotes a transmit precoding matrix indicator or transmit precoding matrix information and may be similarly expressed by beamforming vector information or beam direction information.

In the following description according to the disclosure, UL DCI or UL-related DCI denotes physical layer control signaling (L1 control) including information needed for UL, such as, transmission UL resource configuration information and resource configuration type information such as UL grant, UL power control information, UL cyclic shift or orthogonal cover code (OCC) of a reference signal, channel state information (CSI) request, SRS request, MCS information for each codeword, or a UL precoding information field.

FIG. 1 illustrates a transmission structure of a time-frequency domain that is a DL wireless resource area of an LTE, LTE-A, or a system similar thereto.

Referring to FIG. 1, in a wireless resource area, the horizontal axis represents a time domain, and the vertical axis represents a frequency domain. The minimum transmission unit in the time domain is an OFDM symbol, $N_{symb}$-number of OFDM symbols 102 are gathered to constitute one slot 106, and two slots are gathered to constitute one subframe 105. In this state, the length of a slot may be 0.5 ms, and the length of a subframe may be 1.0 ms. A radio frame 114 is a time domain interval consisting of ten subframes. The minimum transmission unit in a frequency domain is a subcarrier, and a bandwidth of an overall system transmission bandwidth may consist of a total of $N_{RB}^{DL}$-number of subcarriers 104. However, such specific values may be diversely applied according to systems.

A basic unit of a resource in a time-frequency domain is a resource element (RE) 122 and may be expressed by an OFDM symbol index and a subcarrier index. A resource block (RB) or physical resource block (PRB) 108 may be defined by $N_{symb}$-number of consecutive OFDM symbols 102 in the time domain and NRB-number of consecutive subcarriers 110 in the frequency domain. Accordingly, one RB 108 in one slot may consist of $N_{symb} \times N_{RB}$-number of REs 122.

In general, the minimum allocation unit of data in the frequency domain is RB. In the LTE system, in general, $N_{symb}=7$ and $N_{RB}=12$. $N_{BW}$ and $N_{RB}$ may be proportional to the bandwidth of a system transmission bandwidth. A data rate may increase in proportion to the number of RBs scheduled to the UE.

The LTE system may be operated by defining 6 transmission bandwidths. In an FDD system in which DL and UL are operated according to frequencies, a DL transmission bandwidth and a UL transmission bandwidth may be different from each other. In this state, a channel bandwidth indicates an RF bandwidth corresponding to a system transmission bandwidth. Table 1 below shows a relationship between a system transmission bandwidth and a channel bandwidth, which are defined in the LTE system. For example, in an LTE system having a 10 MHz channel bandwidth, a transmission bandwidth may be composed of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

DL control information may be transmitted within initial N-number of OFDM symbols in a subframe. In an embodiment, generally, N={1, 2, 3}. Accordingly, the value N may be variably applied for each subframe according to the amount of control information to be transmitted to a current subframe. The control information to be transmitted may include a control channel transmission interval indicator indicating the number of OFDM symbols used for the transmission of the corresponding control information, scheduling information about DL data or UL data, and information about HARQ ACK/NACK. In the LTE system, scheduling information about DL data or UL data is transmitted from the BS to the UE through DL control information (DCI). DCI may be defined according to various formats, and may indicate, according to each format, whether the DCI is scheduling information about UL data (UL grant) or scheduling information about DL data (DL grant) whether the DCI is compact DCI having a small size of control information, whether the DCI is spatial multiplexing using a multiple antenna is applied, or whether the DCI is DCI for power control. For example, DCI format 1 that is scheduling control information about DL data (DL grant) may include at least one of the following pieces of control information.

Resource allocation type 0/1 flag: to indicate whether a resource allocation method is type 0 or type 1. Type 0 allocates resources in units of resource block groups (RBGs) by using a bitmap method. In the LTE system, a basic unit of scheduling is RB represented by time and frequency domain resources, and RBG is composed of a plurality of RBs to be the basic unit of scheduling in the type 0 method. Type 1 allocates a specific RB in RBG.

Resource block assignment: to indicate RB assigned to data transmission. A resource to be expressed is determined according to a system bandwidth and a resource allocation method.

Modulation and coding scheme (MCS): to indicate a modulation scheme used for data transmission and the size of a transport block (TB) that is data to be transmitted.

HARQ process number: to indicate the process number of HARQ.

New data indicator: to indicate whether it is HARQ initial transmission or retransmission.

Redundancy version: to indicate a redundancy version of HARQ.

Transmit power control (TPC) command for physical UL control channel (PUCCH): to indicate a transmit power control command for PUCCH that is a UL control channel.

DCI may be transmitted on physical DL control channel (PDCCH) (or, control information, mixedly used in the following description) or enhanced PDCCH (EPDCCH) (or, enhanced control information, mixedly used in the following description) after passing through a channel coding and modulation process.

In general, DCI is scrambled into a specific radio network temporary identifier (RNTI) (or, a UE identifier) that is independent of each the UE, is added with a cyclic redundancy check (CRC), is channel coded, and then is transmitted by being configured as independent PDCCH. In the time domain, PDCCH is mapped to the control channel transmission interval and transmitted to the UE. A frequency domain mapping location of PDCCH may be determined by an identifier ID of each the UE, and PDCCH may be transmitted by spreading in the overall system transmission bandwidth.

DL data may be transmitted on a physical DL shared channel (PDSCH) that is a physical channel for DL data transmission. PDSCH may be transmitted after the control channel transmission interval, and a detailed mapping location in the frequency domain and scheduling information of a modulation method are determined based on DCI transmitted by PDCCH.

The BS notifies the UE of a modulation method applied to PDSCH to be transmitted and the size, that is, a transport block size (TBS), of data to be transmitted, by using MCS of control information constituting DCI. TBS corresponds to the size before the BS applies channel coding for error correction to a transport block (TB) of data to be transmitted.

A modulation scheme supported in the LTE system includes quadrature phase shift keying (QPSK), quadrature amplitude modulation (16 QAM), and 64 QAM, and each modulation order (Qm) corresponds to 2, 4, and 6. In other words, 2 bits per symbol for a QPSK modulation, 4 bits per symbol for a 16 QAM modulation, and 6 bits per symbol for a 64 QAM modulation may be transmitted. Furthermore, a 256 QAM or higher modulation method may be used according to system modification.

Figure 2:
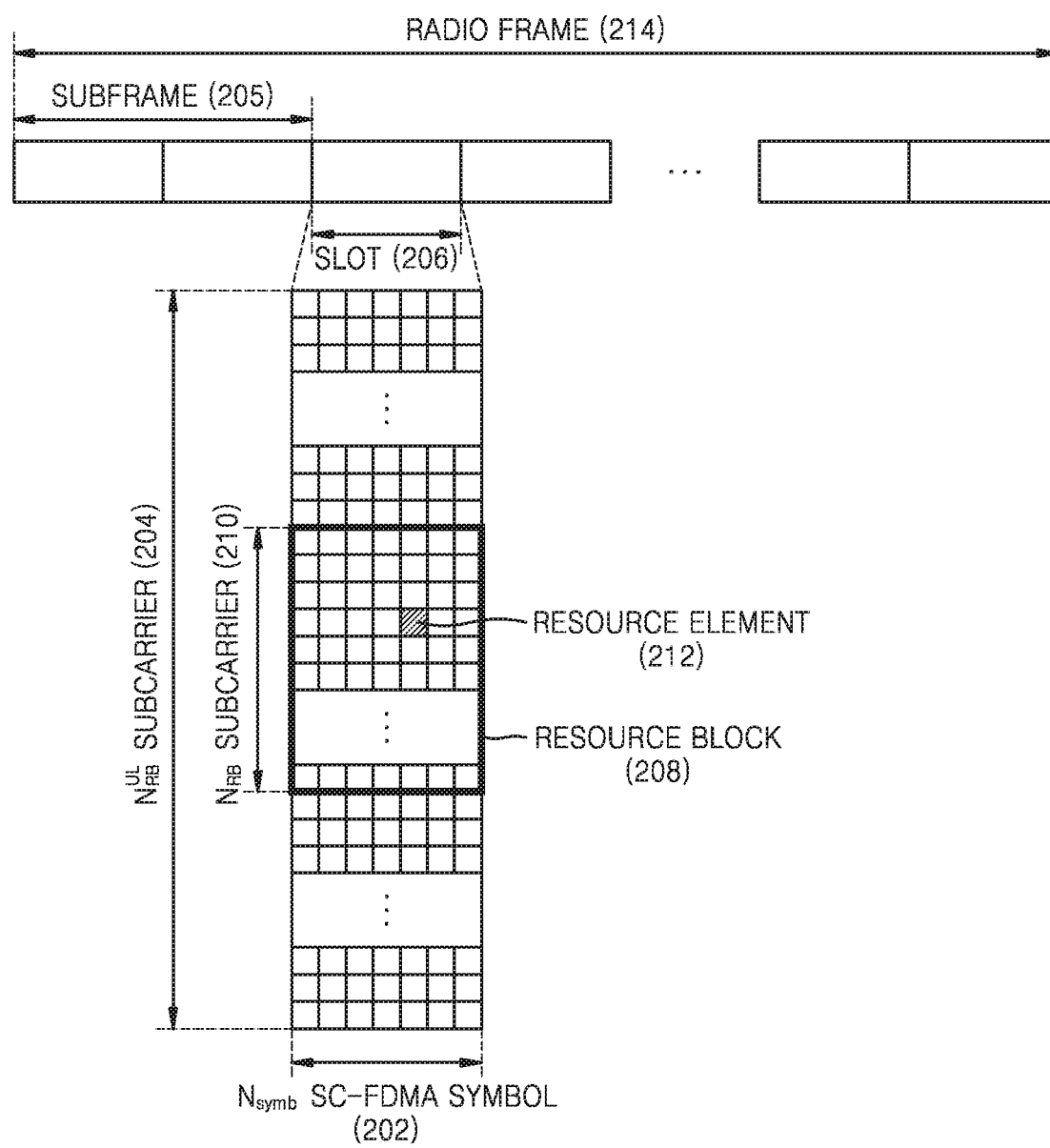
FIG. 2 illustrates a transmission structure of a time-frequency domain that is an uplink wireless resource area of an LTE, LTE-A, or a system similar thereto.

FIG. 2 illustrates a transmission structure of a time-frequency domain that is a UL wireless resource area of an LTE, LTE-A, or a system similar thereto.

Referring to FIG. 2, in a wireless resource area, the horizontal axis represents a time domain and the vertical axis represents a frequency domain. The minimum transmission unit in the time domain is a SC-FDMA symbol 202, and $N_{symb}^{UL}$-number of SC-FDMA symbols are gathered to constitute one slot 206. Two slots are gathered to constitute one subframe 205. The minimum transmission unit in the frequency domain is a subcarrier, and an overall system transmission bandwidth is composed of a total of $N_{RB}^{UL}$-number of subcarriers 204. $N_{RB}^{UL}$ may have a value proportional to the system transmission bandwidth.

A basic unit of a resource in the time-frequency domain is a resource element (RE) 212 and may be defined by a SC-FDMA symbol index and a subcarrier index. A resource block pair (RB pair) 208 may be defined by $N_{symb}^{UL}$-number of consecutive SC-FDMA symbols in the time domain and NRB-number of consecutive subcarriers in the frequency domain. Accordingly, one RB is composed of $N_{symb} \times N_{RB}$-number of REs. In general, the minimum transmission unit of data or control information is in units of RBs. PUCCH is transmitted during one subframe by being mapped with a frequency domain corresponding to one RB.

In the LTE system, a timing relationship of PUCCH or PUSCH that is a UL physical channel, on which HARQ ACK/NACK corresponding to PDSCH that is physical channel for DL data transmission or to PDCCH/EPDDCH including semi-persistent scheduling release (SPS release) is transmitted, may be defined. As an example, in the LTE system that operates as frequency division duplex (FDD), HARQ ACK/NACK corresponding to PDCCH/EPDCCH including PDSCH or SPS release transmitted in the (n−4)th subframe may be transmitted to PUCCH or PUSCH in the n-th subframe.

In the LTE system, DL HARQ employs an asynchronous HARQ method in which a data retransmission time is not fixed. In other words, when receiving a feedback of HARQ NACK from the UE regarding the initial transmission data that the BS transmitted, the BS freely determines the transmission time of retransmission data by a scheduling operation. The UE may perform buffering on data determined to be an error as a result of decoding on reception data for an HARQ operation and then perform combining with retransmission data.

When receiving, in a subframe n, PDSCH including DL data transmitted from the BS, the UE transmits, in a subframe n+k, UL control information including HARQ ACK or NACK of the DL data to the BS on PUCCH or PUSCH. The k may be defined to be different according to FDD or time division duplex (TDD) of the LTE system, and a subframe configuration thereof. As an example, the k is fixed to 4 in an FDD LTE system. In a TDD LTE system, the k may be changed according to the subframe configuration and a subframe number. Furthermore, the value k may be differently applied according to the TDD configuration of each carrier during data transmission through a plurality of carriers.

In the LTE system, unlike DL HARQ, UL HARQ adopts a synchronous HARQ method in which the data transmission time is fixed. In other words, a UL/DL timing relationship of the physical UL shared channel (PUSCH) that is physical channel for UL data transmission and PDCCH that is a DL control channel that precedes, and a physical hybrid indicator channel (PHICH) that is a physical channel on which DL HARQ ACK/NACK corresponding to PUSCH is transmitted may be transmitted and received according to the following rules.

When receiving, in a subframe n, PDCCH including the UL scheduling control information transmitted from the BS or PHICH on which DL HARQ ACK/NACK is transmitted, the UE transmits, in a subframe n+k, UL data corresponding to the control information on PUSCH. In this state, the k may be defined to be different according to the FDD or time division duplex (TDD) of the LTE system and a configuration thereof. As an example, the k may be fixed to 4 in the FDD LTE system. In the TDD LTE system, the k may be changed according to the subframe configuration and the subframe number. Furthermore, the value k may be differently applied according to the TDD configuration of each carrier during data transmission through a plurality of carriers.

When the UE receives, in a subframe i, PHICH including information related to DL HARQ ACK/NACK from the BS, PHICH corresponds to PUSCH that the UE transmitted in a subframe i−k. In this state, the k may be defined to be different according to the FDD or TDD of the LTE system and a configuration thereof. As an example, the k may be fixed to 4 in the FDD LTE system. In the TDD LTE system, the k may be changed according to the subframe configuration and the subframe number. Furthermore, the value k may be differently applied according to the TDD configuration of each carrier during data transmission through a plurality of carriers.

The above description about the wireless communication system is presented based on the LTE system, and the contents of the disclosure is not limited to the LTE system and may be applied to various wireless communication systems such as NR or 5G. Furthermore, when being applied to other wireless communication systems in an embodiment, the value k may be changed and applied in a system using a modulation method corresponding to FDD.

Figure 3:
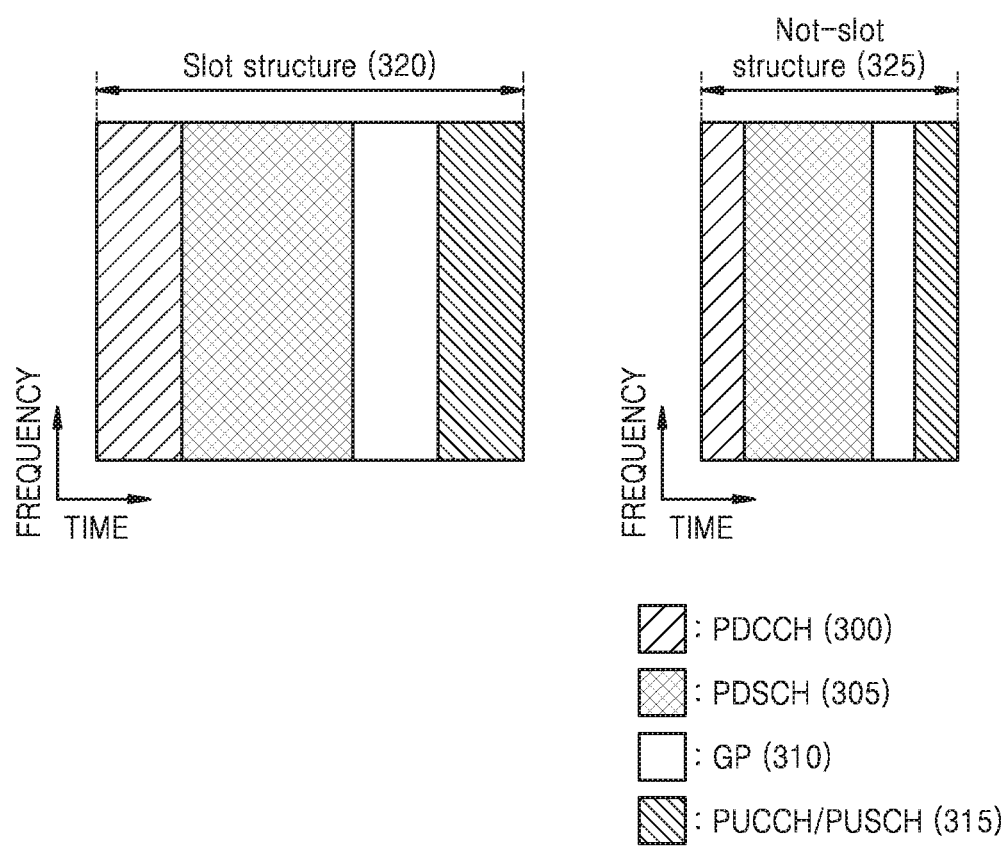
FIG. 3 illustrates a slot structure of a 5G, NR, or a system similar thereto.

FIG. 3 illustrates a slot structure of a 5G, NR, or a system similar thereto.

In 5G, NR, or a system similar thereto, various slot structures may be supported to flexibly deal with a DL and UL request capacity that changes according to an environment such as time or an operation scenario.

Referring to FIG. 3, the UEs may be configured with a slot having various lengths, and a slot may include at least one of a slot structure 320 consisting of 14 or 7 OFDM symbols and a non-slot structure 325 consisting of 1, 2, 3, 4, 5, 6, or 7 OFDM symbols. The non-slot structure 325 is an example of expression and may be expressed by various terms such as a mini slot or a short slot.

As such, the transmission structure of a time-frequency domain configured to be the slot structure 320 or the non-slot structure 325 may be divided into a DL (DL only) structure, a UL/DL mixed structure (similar to an LTE special subframe structure), and a UL (UL only) structures, in terms of the horizontal axis, that is, time. In the disclosure, a UL/DL mixed structure that is the most general structure is described as an example. However, the disclosure is not limited thereto, and the disclosure may be applied to the DL structure and the UL structure. In this case, the DL structure and the UL structure may be described as an example of the UL/DL mixed structure.

In the UL/DL mixed structure, at least one of a DL part, a guard period (GP) 310, or a UL part (UL part) is included in one slot or non-slot structure. The DL part may include at least one of a PDCCH 300, a PDSCH 305, and a DL reference signal such as CSI-RS or DL DMRS. Furthermore, the UL part may include at least one of a PUCCH/PUSCH 315 and a UL reference signal such as SRS or UL DMRS. In this state, the guard period 310, which is a protection interval during a change from DL to UL, as the UE does not need to transmit and receive data during the interval, the UE may perform operations for DL/UL conversion, such as, timing alignment or changing an RF chain.

Figure 4:
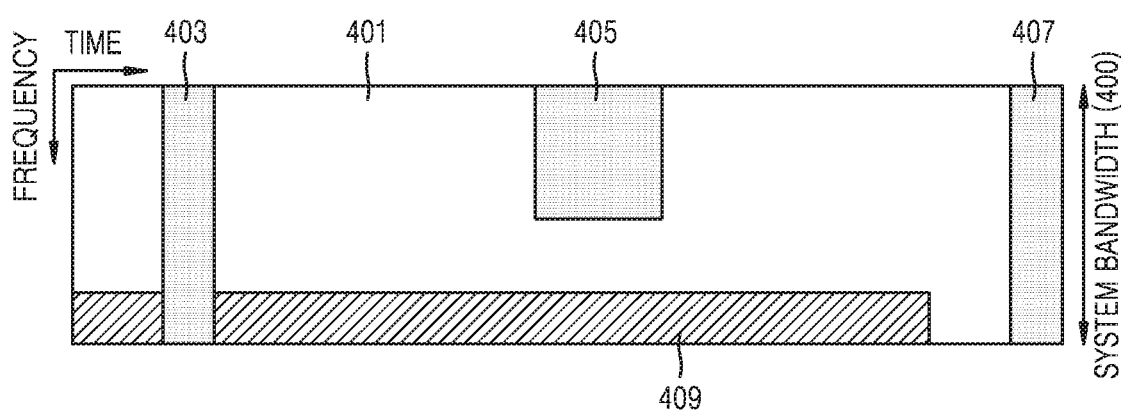
FIGS. 4 and 5 illustrate a method of allocating first-type data, second-type data, and third-type data, which are services considered in a 5G or NR system, in a frequency-time resource.
Figure 5:
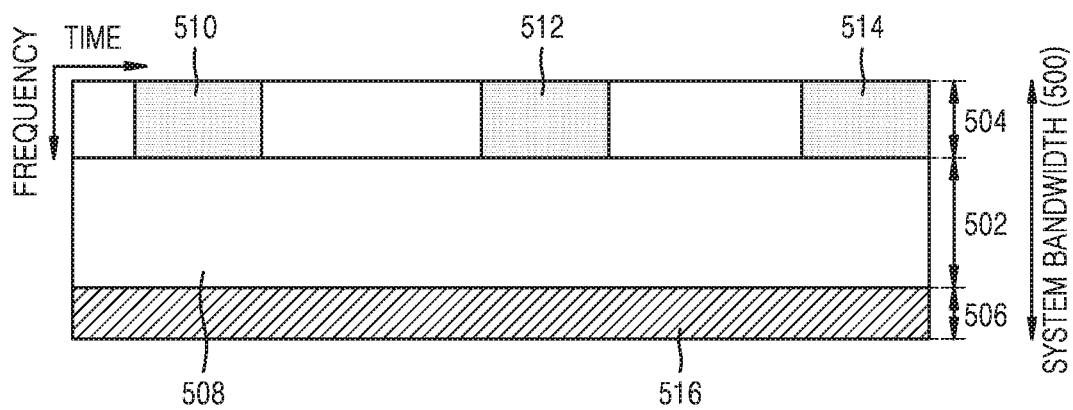

FIGS. 4 and 5 illustrate a method of allocating first-type data, second-type data, and third-type data, which are services considered in a 5G or NR system, in a frequency-time resource.

Referring to FIGS. 4 and 5, a method of allocating frequency and time resources for transmission of information in each system may be checked.

First, in FIG. 4, a first-type data 401, second-type data 403, 405, and 407, and a third-type data 409 may be allocated in an overall system frequency band 400. In the 5G or NR system, when the second-type data 403, 405, and 407 are generated and need to be transmitted while the first-type data 401 and the third-type data 409 are transmitted by being allocated in a specific frequency band, the second-type data 403, 405, and 407 may be transmitted by emptying a portion where the first-type data 401 and the third-type data 409 are already allocated or by stopping the transmission at the allocated portion. For example, when the second-type data 403, 405, and 407 correspond to a service of requesting reduction of latency time among various types of services, the second-type data 403, 405, and 407 may be transmitted by being allocated in a portion of the resource where the first-type data 401 is allocated. When the second-type data 403, 405, and 407 are transmitted by being additionally allocated in the resource where the first-type data 401 is allocated, the first-type data 401 may not be transmitted in the redundant frequency-time resource, and accordingly, transmission performance of the first-type data 401 may deteriorate. In other words, in this case, due to the allocation of the second-type data 403, 405, and 407, a transmission failure of the first-type data 401 may occur.

Referring to FIG. 5, in the 5G or NR system, each of subbands 502, 504, and 506 divided from an overall system frequency band 500 may be used for transmitting services and data. Information related to the subband configuration may be previously determined, and the information may be transmitted from the BS to the UE through higher signaling, according to an embodiment. According to another embodiment, information related to the subband may provide services without transmission of separate subband configuration information to the UE by arbitrarily dividing the BS or network nodes. In FIG. 5, the first subband 502 is used for transmission of a first-type data 508, a second subband 504 is used for transmission of second-type data 510, 512, and 514, and the third subband 506 is used for transmission of a third-type data 516.

In all embodiments, the length of transmission time interval (TTI) used for transmission of the second-type data 510, 512, and 514 may be shorter than the length of TTI of the first-type data 508 or the third-type data 516. Furthermore, a response of the information related to the second-type data 510, 512, and 514 may be transmitted faster than that of the first-type data 508 or the third-type data 516, and accordingly information may be transmitted and received with a low latency.

In the disclosure, although eMBB, URLLC, and mMTC may correspond to examples of the first-type data 401 and 508, the second-type data 403, 405, 407, 510, 512, and 514, and the third-type data 409 and 516, respectively, these are mere examples, and each data type is not limited to the above-described service. For example, the first-type data 401 and 508 may not be limited to eMBB data and may be data of a service requiring high-speed data transmission or performing broadband transmission, the second-type data 403, 405, 407, 510, 512, and 514 may not be limited to URLLC data and may be data of a service requiring a low latency or high reliability transmission, or data of a service simultaneously requiring low latency high reliability transmission, and the third-type data 409 and 516 may not be limited to mMTC data and may be data of a service requiring a low speed or a wide coverage, or a low power.

In an embodiment, the structures of a physical layer channel used for the respective types to transmit the above-described three types of data may differ from one another. For example, at least one of the length of TTI, the allocation unit of a frequency resource, the structure of a control channel, or a data mapping method may differ.

Although in FIGS. 4 and 5 three types of data are described, more types of services and data corresponding thereto may exist, and in this case, the contents of the disclosure may be applied thereto.

Figure 6:
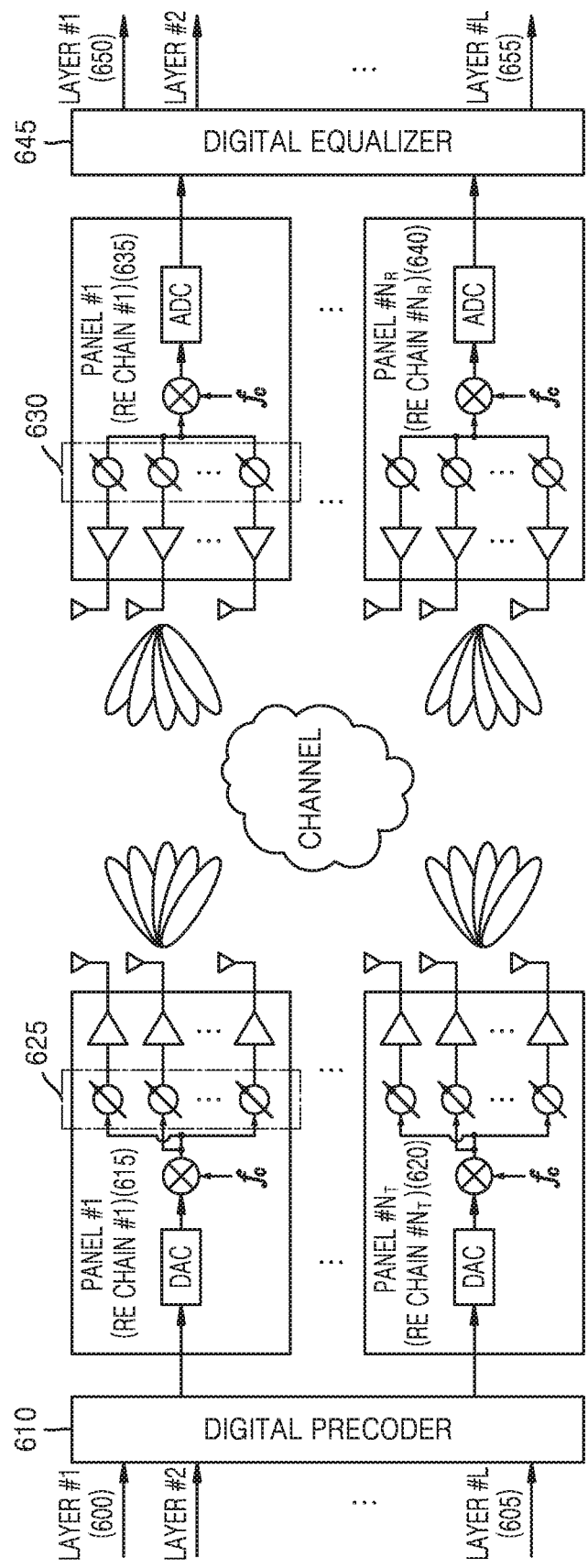
FIG. 6 illustrates a hybrid beamforming structure according to an embodiment.

FIG. 6 illustrates a hybrid beamforming structure according to an embodiment.

Unlike the LTE/LTE-A system that is operated in a band of 6 GHz or less, in the 5G or NR system, an operating band may extend to a high frequency band of up to 100 GHz. As a frequency band increases, the attenuation of a channel increases exponentially, and thus a method to overcome the attenuation of a channel in a high frequency band is needed.

Beamforming is a method of efficiently overcoming the attenuation of a channel in a high frequency band without much increasing the number of the BSs. For example, to secure a coverage similar to the LTE/LTE-A system using a 2-2.5 GHz band, a coverage extension effect of 3 dB may be obtained by supporting up to 4 multi-beams in a wireless system using a 4-6 GHz band. Furthermore, as the interval between antennas needed for beamforming is proportional to the wavelength of a carrier wave, when a frequency band increases, an antenna array form factor may be much improved. Accordingly, in a wireless system using a band of 6 GHz or higher, several tens to hundreds or more of coverage extension effects may be obtained by using several tens to hundreds or more of antenna arrays. However, when channel estimation and report and transmission mechanism as in the related art are applied to a large number of antenna arrays, complexity and channel report overhead of the UE and the BS would be greatly increased. To address this matter, hybrid beamforming of a combination of analog beamforming based on RF and antennas and digital beamforming based on digital precoding is needed. FIG. 6 illustrates the structure of hybrid beamforming.

Referring to FIG. 6, L-number of MIMO layers from a layer #1 600 to a layer #L 605 are distributed to NT-number of panels (or RF chains) from a panel #1 (or an RF chain #1) 615 to a panel #NT (or an RF chain #NT) 620 via a digital precoder 610 of NT×L dimensions. In this state, the digital precoder 610 performs digital precoding in a baseband band.

Then, the signals distributed to each panel is converted to analog signals via a digital-to-analog converter (DAC), and moved to a carrier wave frequency band. Next, a transmission beam in a specific direction is applied to antenna elements that belong to each panel (or an RF chain) through a sending end analog beamforming 625. In this state, in view of the UE, antenna elements in each panel are virtualized by a sending end analog beam to appear to be one antenna port so that channel estimation does not need to be performed on individual antenna elements.

A similar structure thereto may be used at a receiving end. First, the UE receives wireless signals by using many number of panels (or RF chains) consisting of a plurality of antenna elements. In this state, a receiving beam in a specific direction is applied to antenna elements for each panel through a receiving end analog beam 630. Then, the receiving signals are moved to the baseband and then converted to digital signals by an analog-to-digital converter (ADC). The converted signals are distributed to L-number of MIMO layers from a layer #1 650 to a layer #L 655 through a digital equalizer 645 of L×$N_R$ dimensions.

When the number of antenna elements for each transmission panel is $K_T$ and the number of antenna elements for each receiving panel is $K_R$, channel estimation complexity of a structure having a hybrid beamforming structure has a merit of decreasing $1/(K_T K_R)$ times compared to a full digital precoding system. The decrease in the channel estimation complexity of the system having a hybrid beamforming structure is a result when appropriate transmission beams or receiving beams are applied to a transmission panel or a receiving panel. Accordingly, when the hybrid beamforming structure is applied to an actual environment, a method of obtaining information about directions of appropriate transmission beams or receiving beams at a sending end or a receiving end is needed.

In the disclosure, beamforming may mean hybrid beamforming. Furthermore, in the disclosure, performing beamforming may mean performing at least one of digital precoding and analog beamforming. In detail, it may mean application of analog beam and/or precoding.

For DL, the directions of the sending and receiving end beams may be determined according to the following process. First, the BS determines transmission beam direction candidates and applies the determined transmission beam direction candidates to a plurality of synchronization signal blocks (in the following description, referred to as SSB) or CSI-RS resources to transmit the same to the UE. As the BS is capable of receiving a report from the UE regarding preferred SSB or CSI-RS resource indexes to obtain preferred transmission beam direction information of the UE, there is no need to explicitly inform the UE of the direction information of transmission beam candidates. Then, the UE applies different receiving beams to the resources, to which the same transmission beam is applied, in SSB or CSI-RS resource, and determines a preferred receiving beam direction by comparing the same. In view of DL, as the determination of a receiving beam direction of the UE is a process performed in the UE, the UE does not need to report the BS in detail regarding accurate information about the receiving beam direction.

For UL, the following features need to be further considered compared to DL. For UL, as it is difficult for the UE to recognize an overall network situation, when the UE arbitrarily determines a UL beam direction, there may be a bad influence on a cell transmission capacity. Accordingly, the BS may transmit an indication on an analog beam or precoding information to be used when the UE transmits a UL channel or a reference signal such as a physical random access channel (PRACH) or a sounding reference signal (SRS). This means that, for UL, different from DL, the transmitted and received analog beams may be non-transparent at the receiving end or the sending end.

For the LTE/LTE-A system, the SRS is configured based on the following pieces of upper layer signaling information (or a partial set thereof).

BandwidthConfig: to configure SRS bandwidth information. An accurate value meant by each code point may vary according to a UL system bandwidth value.

SubframeConfig (or ConfigIndex): to configure an SRS transmission cycle and transmission offset values. An accurate value meant by each code point may vary according to whether it is an FDD or a TDD.

ackNackSRS-SimultaneousTransmission: to inform whether it is an ACK/NACK-SRS simultaneous transmission.

MaxUpPts: to inform whether a frequency position of SRS transmission is initialized at an UpPTS.

Hopping: to inform, with 2-bit information, whether it is an SRS frequency hopping and a hopping position and method.

Frequency domain position: to inform a frequency domain position of SRS transmission.

Duration: to inform whether it is a transmission of Periodic SRS.

Transmission comb: to inform a comb offset value during the SRS transmission.

Cyclic shift: to inform a cyclic shift value during the SRS transmission.

Antenna port: to inform the number of SRS antenna ports used for the SRS transmission. For the LTE, 1, 2, and 4 ports can be supported.

For the LTE/LTE-A system, periodic and aperiodic SRS transmissions are supported based on these pieces of configuration information. For the 5G or NR system, other than these pieces of configuration information, additional pieces of information such as activation/deactivation signaling on the SRS resource may be used, and periodic, semi-persistent, and aperiodic SRS transmissions are supported. Some of these pieces of configuration information may be omitted depending on the transmission type of SRS.

Table 2 is an antenna port mapping table for PUSCH, SRS, and PUCCH transmissions in the LTE/LTE-A system. Referring to Table 2, it may be seen that port numbers according to the given environments of PUSCH and SRS are the same. For example, when the number of antenna ports is 2, the first antenna port number of both PUSCH and SRS is 20 and the second antenna port number thereof is 21. This means that, in the LTE/LTE-A system, no other beam or precoding is applied to the SRS, compared to the PUSCH.

TABLE 2

| Physical channel or signal | Antenna port number p as a function of the number of antenna ports configured for the respective physical channel/signal | | | |
|---|---|---|---|---|
| | Index p̃ | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |

TABLE 2-continued

| Physical channel or signal | Antenna port number p as a function of the number of antenna ports configured for the respective physical channel/signal | | | |
|---|---|---|---|---|
| | Index p̃ | 1 | 2 | 4 |
| PUCCH | 0 | 100 | 200 | — |
| | 1 | — | 201 | — |

Figure 7:
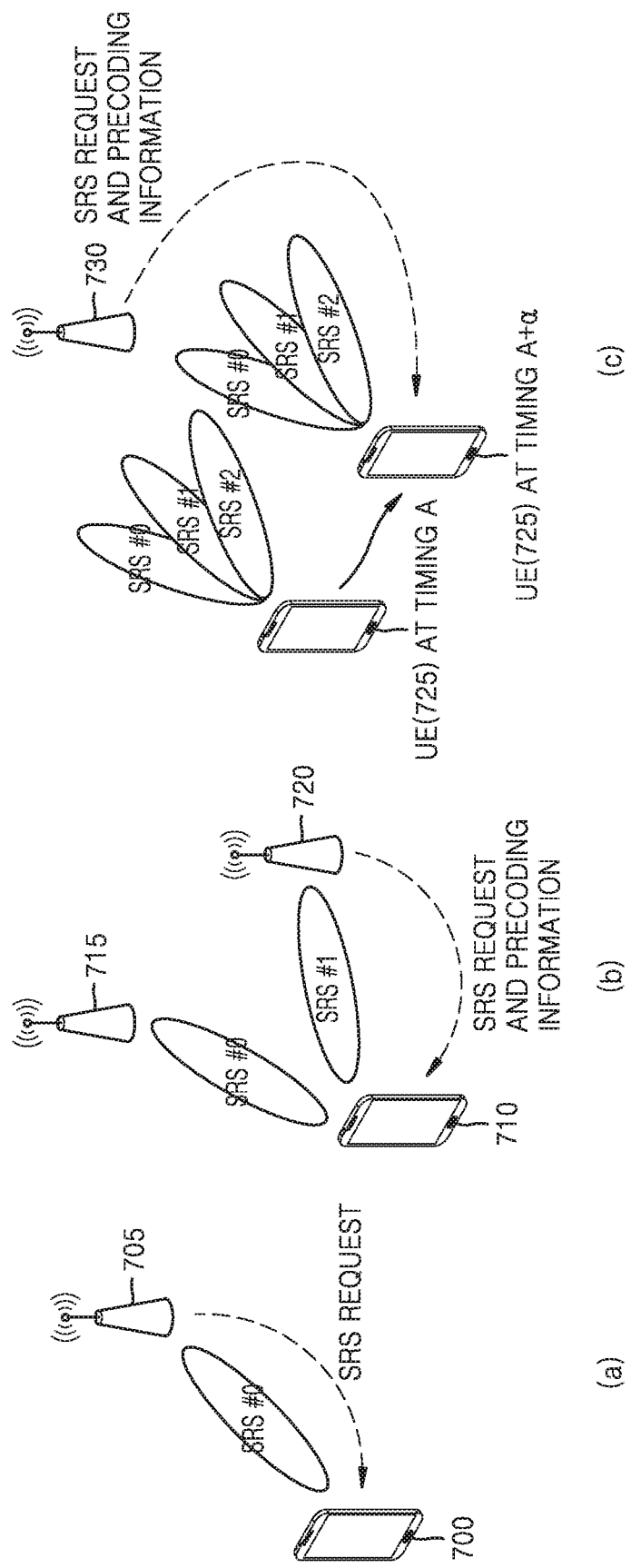
FIG. 7 illustrates an operational scenario of an SRS according to an embodiment.

FIG. 7 illustrates an operational scenario of an SRS according to an embodiment. Referring to FIG. 7, at least three SRS operational scenarios presented below may be considered.

1) Referring to FIG. 7(a), a BS 705 may configure a beam in one direction with respect to an UE 700 (in the disclosure, configuring a beam in one direction and/or precoding includes not applying the beam and/or precoding or applying a wide beam (cell-coverage or sector coverage)), and when it is a periodic SRS or a semi-persistent SRS, the UE 700 may transmit an SRS according to a transmission cycle and offset of the SRS, and when it is an aperiodic SRS, the UE 700 may transmit an SRS according to an SRS request of the BS (at a determined timing after the SRS request). In this state, the SRS does not need additional information for the beam and/or precoding.

2) BSs 715 and 720 may configure beams in one or more directions with respect to a UE 710, and the UE 710 may transmit a plurality of SRSs that are beamformed in one or more configured directions. Referring to FIG. 7(b), an SRS resource (or port) #0 may be configured to be beamformed to the BS 715, and an SRS resource (or port) #1 may be configured to be beamformed to the BS 720. In this case, the BSs 715 and 720, unlike the method of FIG. 7(a), may inform not only the SRS request, but also the beam direction information, that is, SRS beam and/or precoding information, together.

3) A BS 730 may configure beams in one or more directions with respect to an UE 725, and the UE 725 may transmit a plurality of SRSs that are beamformed in the one or more configured directions. For example, FIG. 7(c), the BS 730 may configure the UE to transmit SRSs by applying different beams and/or precodings to an SRS resource (or port) #0, an SRS resource (or port) #1, and an SRS resource (or port) #2. By such a method, even when mobility of the UE is high, stable communication may be performed through beam/precoder diversity. For example, the UE 725 may provide the BS 730 with channel status information at a timing A through the SRS #2, and the BS 730 with channel status information at a timing A+α through the SRS #0. In this case, the BS 730, unlike the method of FIG. 7(a), may inform not only the SRS request, but also the beam direction information, that is, the SRS beam and/or precoding information, together.

Although in FIG. 7 descriptions are presented based on an SRS transmission, such a method may be applied to other UL reference signals or channels such as the PRACH similar thereto.

Figure 8:
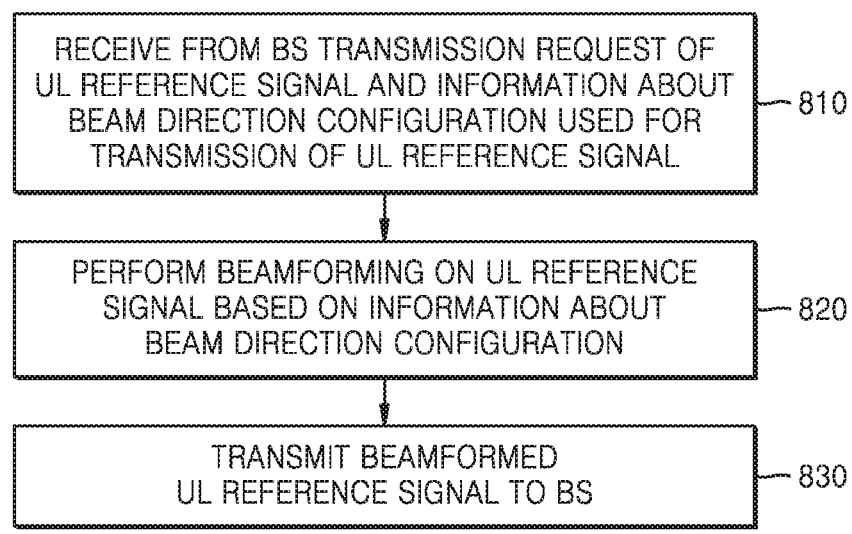
FIG. 8 is a flowchart of a method of transmitting a reference signal or channel of a user equipment, according to an embodiment.

FIG. 8 is a flowchart of a method of transmitting a reference signal or channel of the UE, according to an embodiment.

Referring to FIG. 8, in operation 810, the UE receives from the BS information about the direction of a beam used for the transmission of a UL reference signal or channel. In an embodiment, the information about the direction of a beam used for the transmission of a UL reference signal or channel may include a method of explicitly indicating a beam and/or precoding direction and a method of implicitly indicating a beam and/or precoding direction. In this state, the information about the transmission of a UL reference signal request and the direction of a beam may first receive the transmission of a UL reference signal request or the information about the direction of a beam, or simultaneously the information about the transmission of a UL reference signal request and the information about the direction of a beam.

In an embodiment, the method of implicitly indicating a beam and/or precoding direction may include a method of information the UE of the beam and/or precoding direction of a UL reference signal or channel by using a relationship of DL-UL signals or channels (DL-UL RS/channel association) or a relationship of UL-UL signals or channels (UL-UL RS/channel association), or quasi co-location (QCL) signaling. For example, a correlation between a CSI-RS resource indicator (CRI) indicating some of resources allocated to a CSI-RS that is a DL reference signal configured to the UE and an SRS resource indicator (SRI) indicating some of resources allocated to the SRS that is a UL reference signal configured to the same UE is defined to implicitly indicate the beam and/or precoding direction.

In an embodiment, the method of explicitly indicating a beam and/or precoding direction may include a method of informing the UE of a beam and/or precoding weight by using an indicator such as a transmission precoding matrix Indicator (TPMI) or a transmission beam indicator (TBI). Furthermore, the method of explicitly indicating a beam and/or precoding direction may include a method of informing the UE of a beam direction through direction information of a channel such as angle of arrival (AoA) or an angle of departure (AoD).

In operation 820, the UE performs beamforming on a UL reference signal or channel based on the information about the direction of a beam. In an embodiment, the UE may differently perform a beamforming performing method and signaling a UL reference signal or channel according to the received information about the direction of a beam.

In operation 830, the UE transmits the beamformed UL reference signal or channel to the BS. In an embodiment, when the UE performs transmission of a periodic or semi-persistent UL reference signal, the UE may transmit a UL reference signal that is beamformed in a different direction at each time of the UL reference signal transmission. In this state, the UL reference signal may be an SRS.

A detailed embodiment is described below with reference to the drawings. The description presented below is a mere embodiment, and the disclosure is not limited thereto and may be variously modified. For example, although in FIG. 9 to FIG. 21 the SRS is described as an example of the UL reference signal, the disclosure is not limited thereto and the contents of the disclosure may be applied to other UL reference signals, and further to the transmission of other UL channels such as PRACH.

Figure 9:
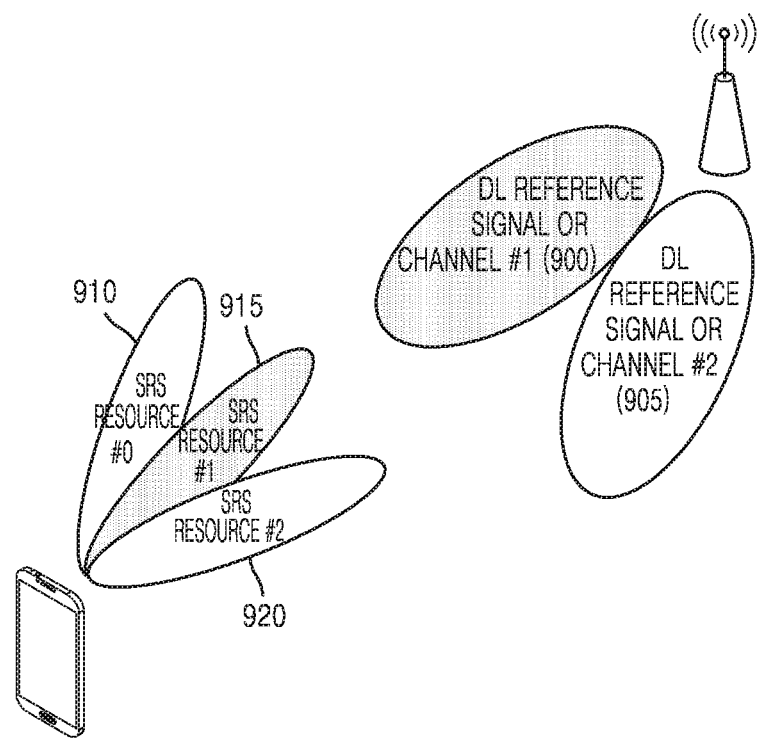
FIG. 9 illustrates a method of configuring the direction of a beam to be used for transmission of a downlink-uplink reference signal or an uplink reference signal according to a channel relationship, according to an embodiment.

FIG. 9 illustrates a method of configuring the direction of a beam to be used for transmission of a DL-UL reference signal or a UL reference signal according to a channel relationship, according to an embodiment.

Referring to FIG. 9, the BS may configure to the UE one or more DL reference signals or channels 900 and 905 and one or more UL reference signals 910, 915, and 920. In an embodiment, the UE may perform beam management based on the configured DL reference signals or channels. The UE may determine a direction of a preferred DL reference signal or channel (transmission beam) 900 and a direction of a receiving beam 915 that is suitable for receiving the preferred DL reference signal or channel (transmission beam) direction 900. In this state, the transmission beam direction for DL transmission and the receiving beam direction together may be referred to as a beam pair link (BPL). When forming a BPL, the UE does not need to report detailed information about the preferred receiving beam direction to the BS. However, the BS may implicitly indicate an SRS beam direction by allowing the UE, when transmitting the SRS, to use the same beam direction as that for the receiving beam used when receiving a specific DL reference signal or channel. For example, the BS may indicate the UE to transmit the SRS by using the SRS resource #1 915, and in this state, to determining the beam direction by referring to the DL reference signal or channel #1 900. In this case, the UE, when receiving the DL reference signal or channel #1 900, may perform beamforming in a beam direction of the SRS resource #1 915.

In an embodiment, the DL-UL reference signal or channel relationship may be independently indicated by the CRI and the SRI, independently by an SSB index and the SRI, or joint indicated by a BPL indicator. In this state, the CRI may be a parameter indicated by the BS, or the most recent CRI reported by the UE.

For example, when a DL reference signal or channel for a DL-UL reference signal or channel relationship is an SSB, the BS may transmit at least one SSB to the UE, and then configure at least one SRS to the UE and configure or indicate a relationship between the SSB and the SRS. Furthermore, when the DL reference signal or channel for a DL-UL reference signal or channel relationship is a CSI-RS, the BS may transmit at least one CSI-RS to the UE, and then configure at least one SRS to the UE and configure or indicate a relationship between the CSI-RS and the SRS. The UE may perform beamforming based on the configuration or indication and transmit the beamformed SRS to the BS.

Figure 10:
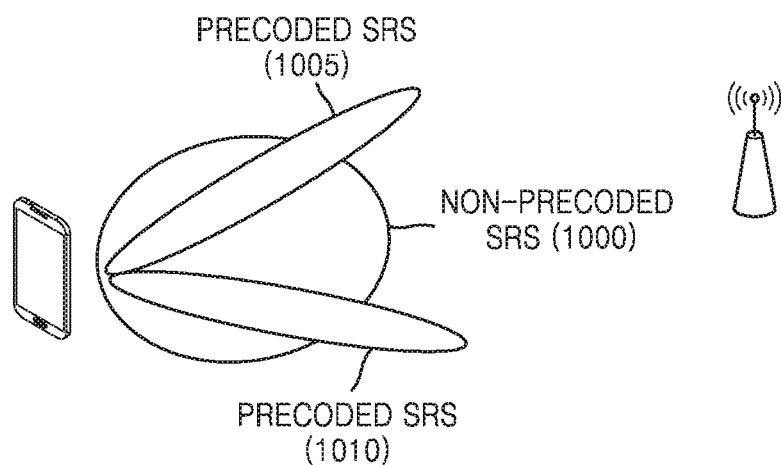
FIG. 10 illustrates a method of configuring the direction of a beam to be used for transmission of an uplink-uplink reference signal or an uplink reference signal according to a channel relationship, according to an embodiment.

FIG. 10 illustrates a method of configuring the direction of a beam to be used for transmission of a UL-UL reference signal or a UL reference signal according to a channel relationship, according to an embodiment.

Referring to FIG. 10, the BS may configure to the UE one or more UL reference signals 1000, 1005, and 1010. In an embodiment, the BS may indicate the UE to determine the direction of the other UL reference signals or channels (transmission beams) 1005 and 1010 based on a part 1000 of the configured UL reference signals or channels. For example, the BS may indicate to the UE the beam and/or precoding direction of the other reference signals or channels 1005 and 1010 based on the specific reference signal or channel 1000. The specific reference signal or channel 1000 may include various signals or channels such as a non-precoded SRS, a wide beam SRS, a lowest indexed SRS, a reference SRS, a basis SRS, a previous SRS, a most lately transmitted SRSa, or PRACH. In an embodiment, a relationship between the other reference signals or channels 1005 and 1010 except the specific reference signal or channel 1000 and the specific reference signal or channel 1000 may be divided into different resources (frequency/time resource positions in a slot) and by a transmission time in the same resource. When the relationship is divided by a transmission time in the same resource, the beam direction may be updated in the same resource based on the previous transmission.

In an embodiment, the transmission of a UL reference signal or channel according to the UL-UL reference signal or channel relationship may be independently indicated by a plurality of SRIs, independently indicated by the PRACH index and the SRI, or joint indicated by a new parameter or upper layer signaling.

For example, when the specific reference signal or channel 1000 for a UL-UL reference signal or channel relationship is an SRS, the BS may transmit at least two pieces of SRS configuration information to the UE, and may configure or indicate a direction relationship between a specific SRS and the other SRSs to the UE. The UE may obtain beam and/or precoding direction information to be applied to the other SRS based on the above configuration or indication. Furthermore, when the specific reference signal or channel 1000 for the UL-UL reference signal or channel relationship is a PRACH, the BS may receive the PRACH from the UE, configure at least one SRS to the UE, and configure or indicate a relationship between the PRACH and the SRS. The UE may obtain the beam and/or precoding direction information to be applied to the SRS based on the configuration or indication.

Like the embodiment illustrated in FIGS. 9 and 10, when the BS implicitly indicates the beam and/or precoding direction by using the relationship of a DL-UL reference signal or channel or the relationship of a UL-UL reference signal or channel, the BS may transmit to the UE indication information indicating whether to perform beamforming on the UL reference signal or channel based on the implicitly indicated information about the beam and/or precoding direction.

In an embodiment, the BS may indicate whether to use the relationship of a DL-UL reference signal or channel or the relationship of a UL-UL reference signal or channel in the beam and/or precoding of a UL reference signal through 1-bit upper layer signaling or L1 signaling, to the UE. When the signaling is 'true', the UE may perform beamforming with respect to a UL reference signal or channel based on the indicated information about the direction of a beam. In other words, the UE may apply the beam and/or precoding to the SRS. In an embodiment, when the signaling is 'false', the UE may use the implicitly indicated information about the direction of a beam. In this case, it may be understood that the BS indicates the UE to transmit a non-precoded SRS or a wide beam SRS without applying the beam and/or precoding to the SRS.

In another embodiment, when the relationship of a DL-UL reference signal or channel is used, and when two or more DL signals or channels are simultaneously related to the UL reference signal or channel, 1-bit upper layer signaling or L1 signaling may indicate to use a relationship having a relatively narrow wide beam. In detail, when two or more SSBs and CSI-RSs are simultaneously related to one SRS resource, it may be determined to indicate to use a relationship with the CSI-RS having a relatively narrow beam. Alternatively, two or more SSBs and CSI-RSs are simultaneously related to one SRS resource, it may be determined to indicate to use a relationship with the SSB having a relatively wide beam.

Figure 11:
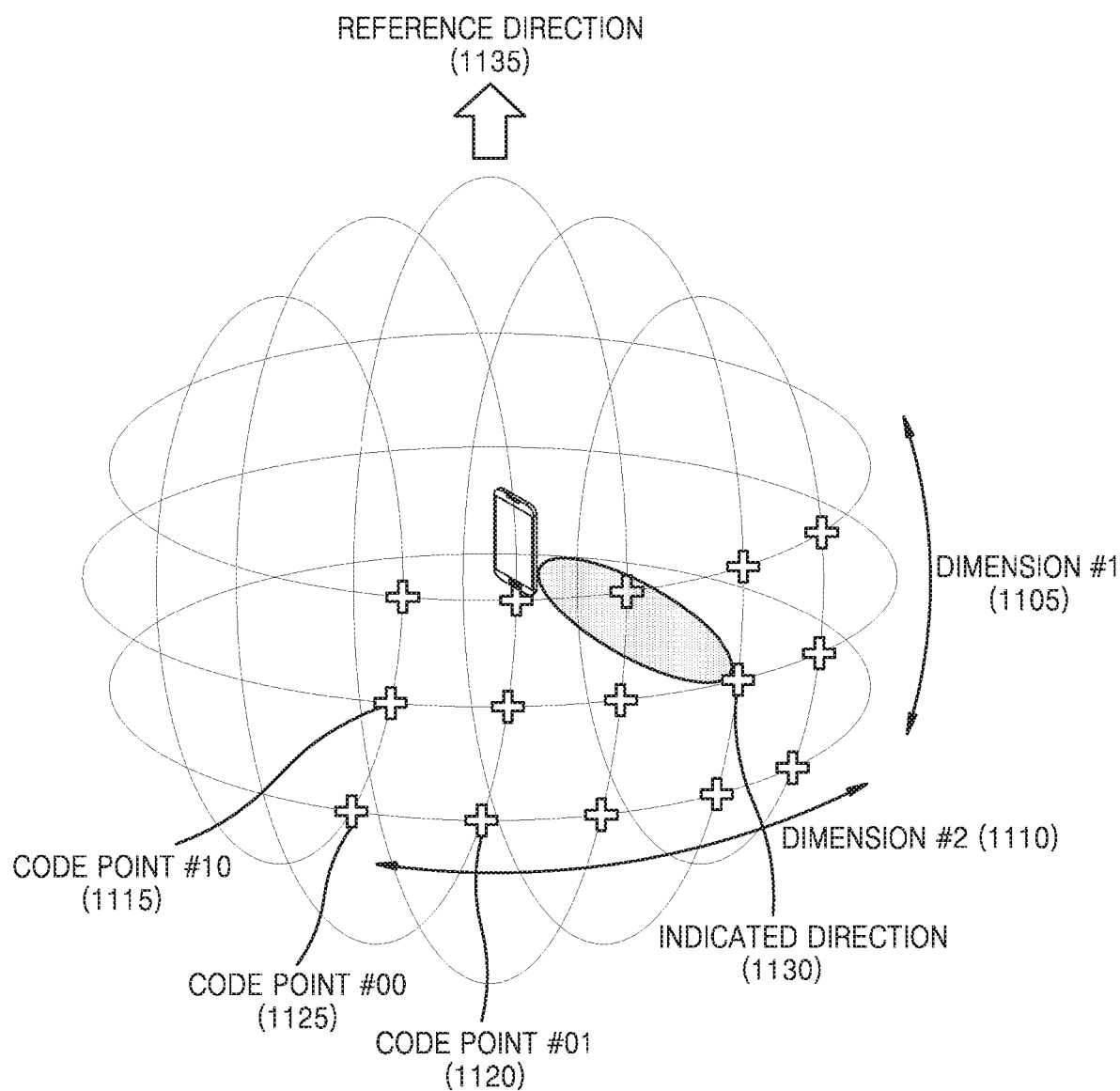
FIG. 11 illustrates a method of configuring the direction of a beam to be used for transmission of an uplink reference signal by explicit indication, according to an embodiment.

FIG. 11 illustrates a method of configuring the direction of a beam to be used for transmission of a UL reference signal by explicit indication, according to an embodiment.

Referring to FIG. 11, the BS may explicitly indicate to the UE the beam and/or precoding direction information about one dimension 1105 or 1110 or two dimensions 1105 and 1110 according to the antenna array structure of the UE. The one dimension 1105 or 1110 or the two dimensions 1105 and 1110 may be quantized into a limited number of code points for explicit indication (1115, 1120, 1125, and 1130). The BS may indicate that the UE performs beamforming in one direction 1130 among code points to transmit the UL reference signal or channel. The BS may inform the UE of a beam and/or precoding weight by using an indicator such as TPMI or TBI, or may explicitly indicate beam and/or precoding direction information to the UE by a method of informing the UE of a beam direction through direction information of a channel such as AoA or AoD.

In an embodiment, when the indicator such as TPMI or TBI is used, spatial information of up to two dimensions may be quantized through a digital Fourier transform (DFT) vector, and when the direction information of the channel such as AoA or AoD is used, the up to two dimensions may be quantized for each specific angle, for example, by 1 degree, from 0 degree to 360 degrees. In this state, the beam and/or precoding direction may be defined based on a specific reference point, and a specific reference point may be defined to be the true north (or true south) direction or to be a boresight of an antenna array or a panel structure of the UE. In an embodiment, when the reference point is defined to be the true north (or true south) direction, the UE may apply beam and/or precoding to the UL reference signal based on a fixed reference point regardless of a rotation state of the UE. When the reference point is defined to be the boresight of the antenna array or the panel structure of the UE, the reference signal beam and/or precoding direction may be flexibly changed according to the rotation state of the UE.

In an embodiment, the transmission of a UL reference signal by the explicit indication may be provided by one of the following code book examples.

The first method is a definition method of a beam group based on hierarchical PMI. In an embodiment, a PMI indicating one code point may consist of two or more sub-PMIs. When the PMI consists of two sub-PMIs, the first PMI may mean one of beam group indexes including a specific number of precoding vectors, and the second PMI may mean one of the indexes of the precoding vectors included in the beam group. For example, a UL code book consisting of an M-number of the UE transmission antennas and beam groups $G_i$ including a B-number of DFT precoding vectors $v_k$ based on the oversampling factor of O may be defined by Equation 1 below.

$$v_k = \frac{1}{\sqrt{M}} \times [\, 1 \quad e^{j\frac{2\pi k}{OM}} \quad e^{j\frac{4\pi k}{OM}} \quad \ldots \quad e^{j\frac{2\pi(M-1)k}{OM}} \,]^T \quad \text{[Equation 1]}$$

$$G_i = [\, v_{Ai} \quad v_{\text{mod}(Ai+1,OM)} \quad \ldots \quad v_{\text{mod}(Ai+B-2,OM)} \quad v_{\text{mod}(Ai+B-1,OM)} \,]$$

In this state, A, which is a beam skipping factor, means an interval between the beam groups (beam unit). Furthermore, the first PMI I may mean an index of a beam group, and a single precoding vector may be assigned by the second PMI having a payload of $\lceil \log_2 B \rceil$.

The second method is a definition method of a beam or a beam group based on the PMI of a single structure. In an embodiment, one PMI may be understood as an indicator that indicates a single beam or a beam group according to the higher layer or physical layer signaling. For example, a UL code book consisting of the M-number of the UE transmission antennas and beam groups $G_i$ including the I-th DFT precoding vector $v_i$ and B-number of DFT precoding vectors based on the oversampling factor of O may be defined by Equation 2 below.

$$v_i = \frac{1}{\sqrt{M}} \times \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T \quad \text{[Equation 2]}$$

$$G_i = \begin{bmatrix} v_i & v_{\mathrm{mod}(i+1,OM)} & \cdots & v_{\mathrm{mod}(i+B-2,OM)} & v_{\mathrm{mod}(i+B-1,OM)} \end{bmatrix}$$

In this state, when a higher layer or physical layer signaling indicates dynamic beamforming or wide band precoding, the i-th PMI may be understood to indicate $v_i$. In contrast, when the higher layer or physical layer signaling indicates semi-dynamic beamforming or subband precoding, the i-th PMI may be understood to indicate $G_i$. Table 3 shows a TPMI interpretation method when dynamic beamforming or semi-dynamic beamforming transmission or wide band or subband precoding is assigned by the higher layer signaling in an embodiment. Furthermore, Table 4 shows a TPMI interpretation method when dynamic beamforming or semi-dynamic beamforming transmission or wide band or subband precoding is assigned by the physical layer signaling in an embodiment.

TABLE 3

| | Precoder or precoder group | |
|---|---|---|
| PMI value i | BeamformingScheme = 'Dynamic' | BeamformingScheme = 'Semi-dynamic' |
| 0 | $v_0$ | $G_0$ |
| 1 | $v_1$ | $G_1$ |
| 2 | $v_2$ | $G_2$ |
| ... | ... | ... |
| OM − 1 | $v_{OM-1}$ | $G_{OM-1}$ |

TABLE 4

| PMI value i | Beamforming scheme | Precoder or precoder group |
|---|---|---|
| 0 | Dynamic | Precoder $v_0$ |
| 1 | Dynamic | Precoder $v_1$ |
| 2 | Dynamic | Precoder $v_2$ |
| ... | ... | ... |
| OM − 1 | Dynamic | Precoder $v_{OM-1}$ |
| OM | Semi-dynamic | Precodergroup $G_0$ |
| OM + 1 | Semi-dynamic | Precoder group $G_1$ |
| OM + 2 | Semi-dynamic | Precoder group $G_2$ |
| ... | ... | ... |
| 2OM − 1 | Semi-dynamic | Precoder group $G_{OM-1}$ |

Equation 1 and Equation 2 relate to an embodiment of describing a code book consisting of a one dimension DFT vector when the transmission antennas of the UE are in a one-dimensional antenna format. However, when the transmission antennas of the UE are in a two-dimensional antenna format, another form of a UL code book may be used. In an embodiment, when the transmission antennas format of the UE include an M1-number of antenna ports in the first dimension and an M2-number of antenna ports in the second dimension, the precoding vector $V_{m1,m2}$ and the beam group $G_{m1,m2}$ as in Equation 3 may be defined through a pair of indexes m1 and m2.

$$v_{m_1,m_2} = \frac{1}{\sqrt{M_1 M_2}} \times \begin{bmatrix} 1 & e^{j\frac{2\pi m_1}{O_1 M_1}} & e^{j\frac{4\pi m_1}{O_1 M_1}} & \cdots & e^{j\frac{2\pi(M_1-1)m_1}{O_1 M_1}} \end{bmatrix}^T \otimes \quad \text{[Equation 3]}$$

$$\begin{bmatrix} 1 & e^{j\frac{2\pi m_2}{O_2 M_2}} & e^{j\frac{4\pi m_2}{O_2 M_2}} & \cdots & e^{j\frac{2\pi(M_2-1)m_2}{O_2 M_2}} \end{bmatrix}^T = v_{m_1} \otimes v_{m_2}$$

$$G_{m_1,m_2} = G_{m_1} \otimes G_{m_2}$$

$$G_{m_i} = \begin{bmatrix} v_{m_i} & v_{\mathrm{mod}(m_i+1, O_i M_i)} & \cdots & v_{\mathrm{mod}(m_i+B_i-2, O_i M_i)} & v_{\mathrm{mod}(m_i+B_i-1, O_i M_i)} \end{bmatrix}$$

Equation 1, Equation 2, and Equation 3 relate to an embodiment when all transmission antennas of the UE have the same polarization. When the transmission antennas of the UE are in a dual-polarized format, a UL code book may be modified considering the above matter. In an embodiment, when the transmission antennas of the UE are in a one-dimensional format consisting of an M-number of antenna ports for each polarization, that is, a total of 2M-number of antenna ports, a rank 1 precoding vector $V_{i,k}$ and a beam group $G_m$ may be defined as in Equation 4.

$$v_{i,k} = \frac{1}{\sqrt{2M}} \times \begin{bmatrix} d_i \\ \phi_k d_i \end{bmatrix} \quad \text{[Equation 4]}$$

$$d_i = \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T, \quad \phi_k = e^{j2\pi k/K}$$

$$G_m = \begin{bmatrix} v_m & v_{\mathrm{mod}(m+1,OM)} & \cdots & v_{\mathrm{mod}(m+B-2,OM)} & v_{\mathrm{mod}(m+B-1,OM)} \end{bmatrix},$$

$$m = (K-1)i + k$$

In Equation 4, K denotes a co-phasing quantization level.

In another embodiment, when the transmission antennas of the UE are in a two-dimensional format consisting of an M1M2-number of for each polarization, that is, a total of 2×M1M2-number of antenna ports, a rank 1 precoding vector $V_{m1,m2,k}$ may be defined as in Equation 5 below. In this state, M1 and M2 are the numbers of the UE transmission antenna ports for each polarization included in the first dimension and the second dimension, respectively. The beam group may be configured to be similar to Equation 3 based on $V_{m1,m2,k}$ of Equation 5.

$$v_{m_1,m_2,k} = \frac{1}{\sqrt{2M_1 M_2}} \times \begin{bmatrix} d_{m_1} \otimes d_{m_2} \\ e^{\phi_k} d_{m_1} \otimes d_{m_2} \end{bmatrix} \quad \text{[Equation 5]}$$

$$d_{m_1} = \begin{bmatrix} 1 & e^{j\frac{2\pi m_1}{O_1 M_1}} & e^{j\frac{4\pi m_1}{O_1 M_1}} & \cdots & e^{j\frac{2\pi(M_1-1)m_1}{O_1 M_1}} \end{bmatrix}^T$$

$$d_{m_2} = \begin{bmatrix} 1 & e^{j\frac{2\pi m_2}{O_2 M_2}} & e^{j\frac{4\pi m_2}{O_2 M_2}} & \cdots & e^{j\frac{2\pi(M_2-1)m_2}{O_2 M_2}} \end{bmatrix}^T$$

Table 3 and Table 4 that are examples of signaling with respect to the dynamic beamforming or semi-dynamic beamforming transmission or the wide band or subband precoding may be applied to all the above-described code book embodiments. Although in the above-described embodiments the description is presented based on the rank 1 code book indicating a single direction, the disclosure is not limited thereto and the contents of the disclosure may be identically applied to a code book of rank 2 or higher indicating two or more directions.

Figure 12:
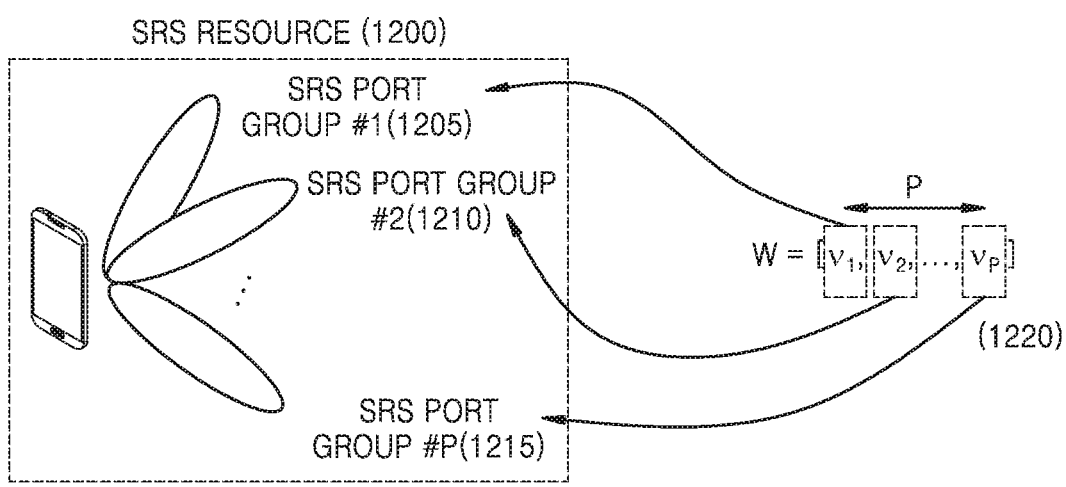
FIG. 12 illustrates a method of beamforming for each port group in a single SRS resource, according to an embodiment.

FIG. 12 illustrates a method of beamforming for each port group in a single SRS resource, according to an embodiment.

Referring to FIG. 12, when the BS assigns one SRS resource 1200 of the configured SRS resources to the UE and transmits an indicator such as TPMI or TBI or direction information 1220 of a channel such as AoA or AoD to the UE, the UE may perform beamforming on SRS port groups 1205, 1210, and 1215 in the SRS resource 1200 that is assigned based on the indicator such as TPMI or TBI or the direction information about a channel such as AoA or AoD received from the BS. In this state, the SRS port group may include at least one SRS port, that is, the SRS port group may include a single SRS port. The beam and/or precoding in the same direction may be applied to each SRS port group. The number of the indicators such as TPMI or TBI or the pieces of direction information about a channel such as AoA or AoD that are transmitted to the UE is the same as the number P of the SRS port groups. This means that the channel direction information of the indicator such as TPMI or TBI for PUSCH and the indicator such as TPMI or TBI for SRS is operated based on the same precoding matrix, a rank for SRS TPMI (or the number of column vectors) is the same as the number of SRS port groups.

When the embodiment illustrated in FIG. 12 is supported through L1 signaling, the SRS request may indicate a specific SRS resource of the SRS resources configured to the UE and simultaneously transmit pieces of the beam and/or precoding information about the indicated SRS. For example, the beam and/or precoding information for a UL reference signal may be transmitted as a separate DCI payload. In another embodiment, when an SRS request field denotes SRS transmission, TPMI information for a PUSCH in a UL-related DCI (or UL grant) may be recognized by being converted to the beam and/or precoding information for a UL reference signal. In this case, while a degree of freedom of the beam and/or precoding on a PUSCH and SRS decreases, DCI overhead may be reduced.

When the embodiment illustrated in FIG. 12 is supported through the upper layer signaling, the SRS request may indicate a specific SRS resource of the SRS resources configured to the UE, and values preconfigured by the upper layer may be applied to the pieces of beam and/or precoding information about the indicated SRS resource. For example, each UL reference signal configuration information may include the beam and/or precoding information for each resource. In another embodiment, the beam and/or precoding information about each code point of the RS request field may be configured by the upper layer. In this case, while the degree of freedom of the beam and/or precoding on an SRS may be lowered, the signaling overhead may be reduced.

The embodiment illustrated in FIG. 12 may be supported in a hybrid form of the L1 signaling and the upper layer signaling. For example, when the indicator such as TPMI or TBI for SRS or the direction information about a channel such as AoA or AoD consists of two steps (beam group+ beam selection), the first value, that is, a beam group, may be configured by an upper layer, and the second value (beam selection) may be determined through the L1 signaling. Accordingly, the degree of freedom of the beam and/or precoding on the SRS is obtained, and simultaneously signaling overhead may be reduced.

Figure 13:
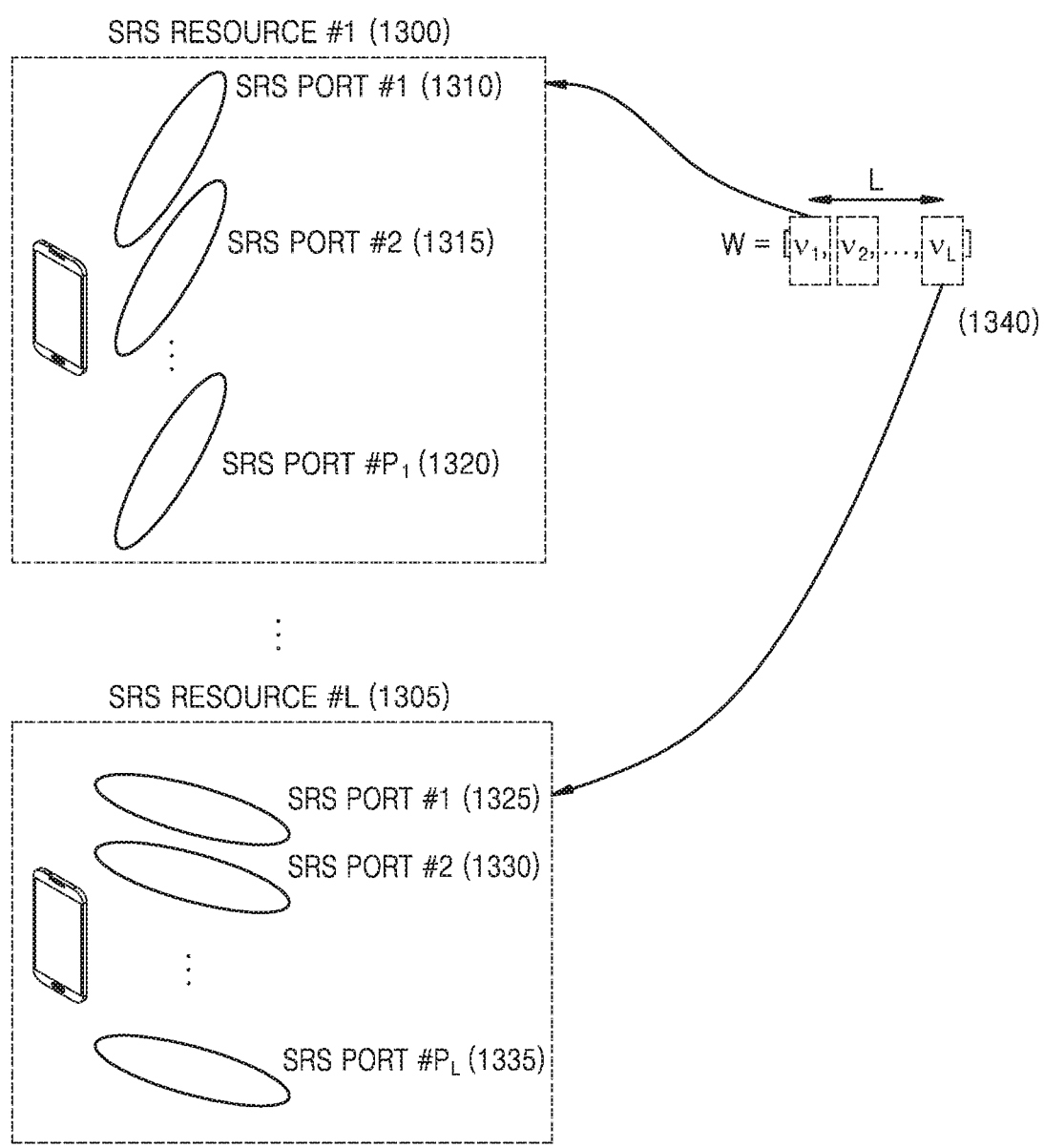
FIG. 13 illustrates a method of beamforming for each port in a plurality of SRS resources, according to an embodiment.

FIG. 13 illustrates a method of beamforming for each port in a plurality of SRS resources, according to an embodiment.

Referring to FIG. 13, when the BS assigns a plurality of SRS resources 1300 and 1305 of the SRS resources configured to the UE and transmits the indicator such as TPMI or TBI or the direction information 1340 about a channel such as AoA or AoD to the UE, the UE may perform beamforming on the assigned SRS resources 1300 and 1305 based on the indicator such as TPMI or TBI or the direction information 1340 about a channel such as AoA or AoD received from the BS. In this state, the SRS resources may include at least one SRS port, that is, each SRS resource may include a single SRS port, and the beam and/or precoding in the same direction is applied to all SRS ports 1310, 1315, 1320, 1225, 1330, and 1335 belonging to each SRS resource. The number of the indicators such as TPMI or TBI or the pieces of direction information 1340 about a channel such as AoA or AoD transmitted to the UE is the same as the number L of the SRS resources. This means that, when the direction information of the channel of the indicator such as TPMI or TBI for PUSCH and the indicator such as TPMI or TBI for SRS is operated based on the same precoding matrix, the rank for SRS TPMI (or the number of column vectors) is the same as the number of the SRS resources.

When the embodiment illustrated in FIG. 13 is supported through L1 signaling, the SRS request may indicate specific SRS resources 1300 and 1305 of the SRS resources configured to the UE and simultaneously transmit pieces of the beam and/or precoding information 1340 about the indicated SRS. For example, the beam and/or precoding information for a UL reference signal may be transmitted as a separate DCI payload. In another embodiment, when the SRS request field means SRS transmission, TPMI information for PUSCH in a UL-related DCI (or UL grant) may be recognized by being converted to the beam and/or precoding information for a UL reference signal. In this case, while the degree of freedom of the beam and/or precoding on a PUSCH and SRS decreases, DCI overhead may be reduced.

When the embodiment illustrated in FIG. 13 is supported through the upper layer signaling, the SRS request may indicate a specific SRS resource of the SRS resources configured to the UE, and the values preconfigured by the upper layer may be applied to pieces of the beam and/or precoding information about the indicated SRS resource. For example, each UL reference signal configuration information may include the beam and/or precoding information for each resource. In another embodiment, the beam and/or precoding information about each code point of the RS request field may be configured by the upper layer. In this case, while the degree of freedom of the beam and/or precoding on the SRS decreases, signaling overhead may be reduced.

The embodiment illustrated in FIG. 13 may be supported in the hybrid form of the L1 signaling and the upper layer signaling. For example, when the indicator such as TPMI or TBI for SRS or the direction information about a channel such as AoA or AoD consists of two steps (beam group+ beam selection), the first value, that is, a beam group, may be configured by an upper layer, and the second value (beam selection) may be determined through the L1 signaling. Accordingly, the degree of freedom of the beam and/or precoding on the SRS is obtained, and simultaneously signaling overhead may be reduced.

Figure 14:
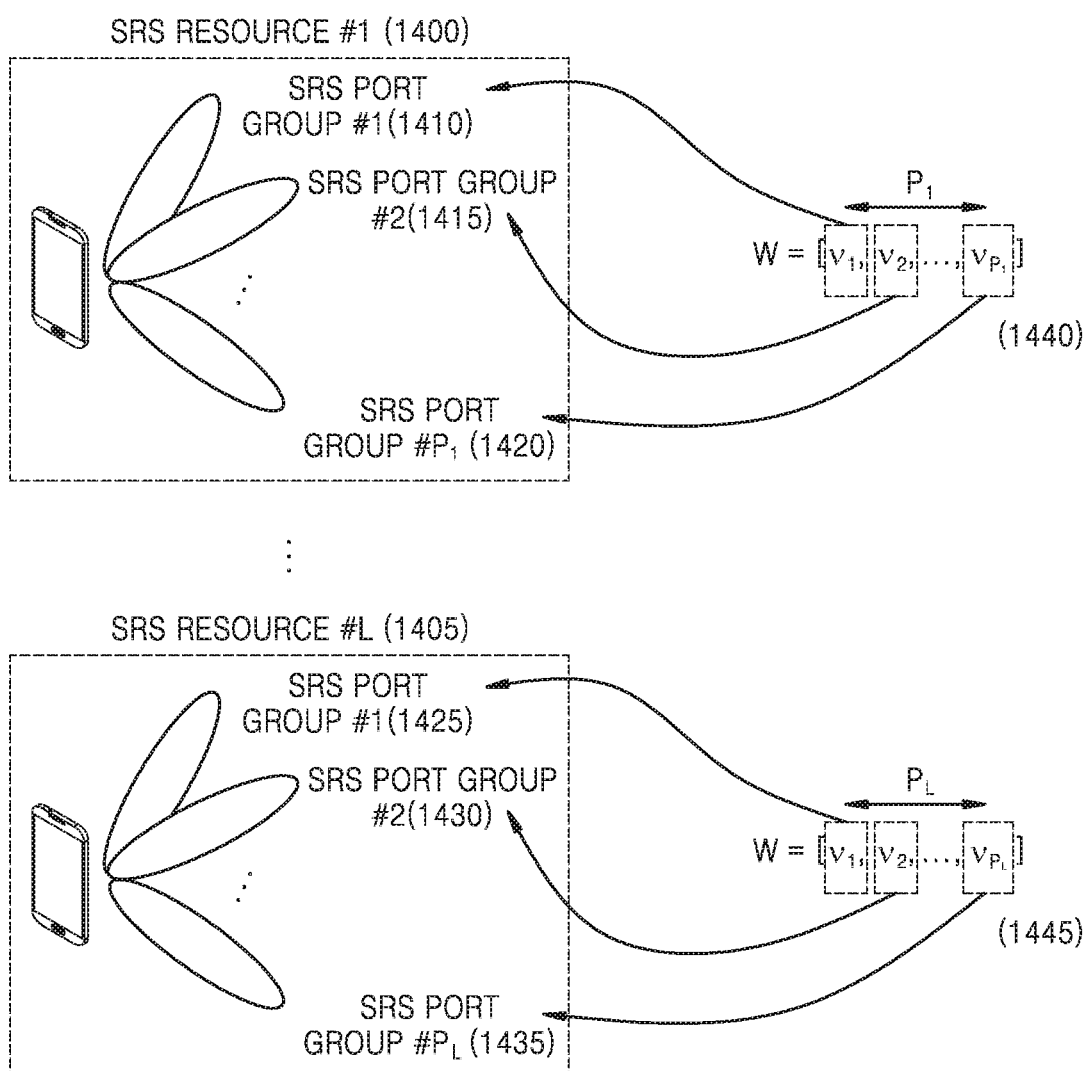
FIG. 14 illustrates a method of beamforming for each port group in a plurality of SRS resources according to an embodiment.

FIG. 14 illustrates a method of beamforming for each port group in a plurality of SRS resources according to an embodiment.

Referring to FIG. 14, when the BS assigns a plurality of SRS resources 1400 and 1405 of the SRS resources configured to the UE and transmits the indicator such as TPMI or TBI or pieces of direction information 1440 and 1445 about a channel such as AoA or AoD to the UE, the UE may perform beamforming on SRS port groups 1410, 1415, 1420, 1425, 1430, and 1435 in the assigned SRS resources 1400 and 1405 based on the indicator such as TPMI or TBI or the pieces of direction information 1440 and 1445 about a channel such as AoA or AoD received from the BS. The number of the indicators such as TPMI or TBI or the pieces of direction information 1340 about a channel such as AoA or AoD transmitted to the UE is the same as the number Pi of the SRS port groups. In other words, as illustrated in FIG. 14, the number of port groups of each SRS resource may differ, that is, P1 in the SRS resource #1 1400 and the PI in the SRS resource #L 1405, and when the direction information of a channel of the indicator such as TPMI or TBI for PUSCH and the indicator such as TPMI or TBI for SRS is operated based on the same precoding matrix, the rank for SRS TPMI (or the number of column vectors) is the same as the number of the SRS port groups.

When the embodiment illustrated in FIG. 14 is supported through the L1 signaling, the SRS request may indicate the specific SRS resources 1400 and 1405 of the SRS resources configured to the UE and simultaneously transmit pieces of the beam and/or precoding information 1440 about the indicated SRS. For example, the beam and/or precoding information for a UL reference signal may be transmitted as a separate DCI payload. In another embodiment, when the SRS request field means SRS transmission, TPMI information for PUSCH in a UL-related DCI (or UL grant) may be recognized by being converted to the beam and/or precoding information for a UL reference signal. In this case, while the degree of freedom of the beam and/or precoding on a PUSCH and SRS decreases, DCI overhead may be reduced.

When the embodiment illustrated in FIG. 14 is supported through the upper layer signaling, the SRS request may indicate a specific SRS resource of the SRS resources configured to the UE, the values preconfigured by the upper layer may be applied to the pieces of beam and/or precoding information about the indicated SRS resource. For example, each UL reference signal configuration information may include the beam and/or precoding information for each resource. In another embodiment, the beam and/or precoding information about each code point of the RS request field may be configured by the upper layer. In this case, while the degree of freedom of the beam and/or precoding on the SRS decreases, signaling overhead may be reduced.

The embodiment illustrated in FIG. 14 may be supported in the hybrid form of the L1 signaling and the upper layer signaling. For example, when the indicator such as TPMI or TBI for SRS or the direction information about a channel such as AoA or AoD consists of two steps (beam group+beam selection), the first value, that is, a beam group, may be configured by an upper layer, and the second value (beam selection) may be determined through the L1 signaling. Accordingly, the degree of freedom of the beam and/or precoding on the SRS is obtained, and simultaneously signaling overhead may be reduced.

Figure 15:
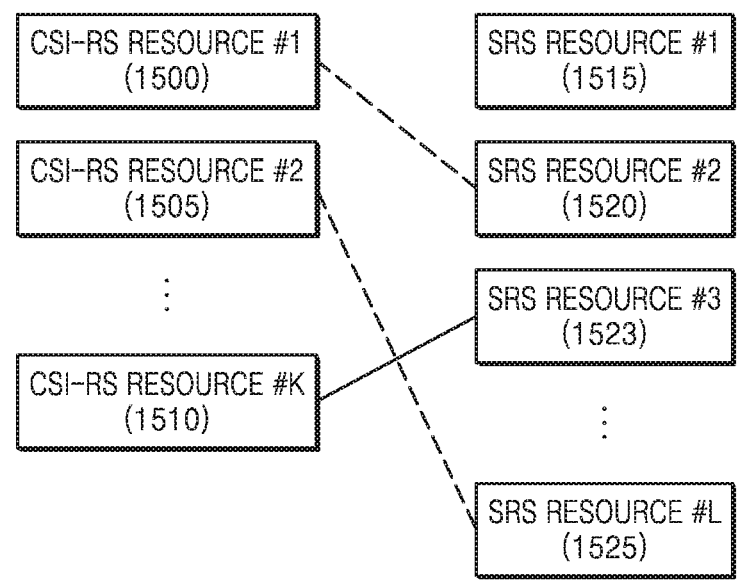
FIG. 15 illustrates a relationship according to an embodiment.

FIG. 15 illustrates a relationship according to an embodiment.

Although in FIG. 15 the relationship of a DL-UL reference signal or channel is presented as an example of a method of implicit SRS beam and/or precoding indication, this is a mere embodiment, and various embodiments such as the relationship of a UL-UL reference signal or channel may be employed. Referring to FIG. 15, the BS may configure to the UE one or more CSI-RS resources 1500, 1505, and 1510 and one or more SRS resources 1515, 1520, 1523, and 1525 to indicate beams in various directions. The BS may transmit information about a relationship between a specific CSI-RS and a specific SRS to the UE.

The relationship may be signaled to the UE through various methods. In an embodiment, the relationship may be signaled based on independent CRI and SRI. For example, when a CRI that is dynamically indicated by a DCI or MAC CE indicates a CSI-RS resource #K 1510, and an SRI that is also dynamically indicated by the DCI or MAC CE indicates an SRS resource #3 1523, the CSI-RS resource and the SRS resource may be determined to have a relationship with each other. In an embodiment, a relationship between the CSI-RS and the SRS is predetermined through the upper layer signaling, and part of the relationship may be activated through the L1 signaling. For example, the BS may signal, as illustrated in FIG. 15, M-number of relationships of a relationship #1={CSI-RS resource #1, SRS resource #2}, a relationship #2={CSI-RS resource #2, SRS resource #L}, . . . , a relationship #M={CSI-RS resource #K, SRS resource #3} to the UE through the upper layer. Then, when the BS indicates a specific relationship through the L1 signaling, the relationship may be activated and the other non-indicated relationships may be deactivated. It may be possible to keep flexibility of relationship configurations while remarkably reducing signaling overhead through the two-step access method.

In an embodiment, all SRS resources do not necessarily have relationships. For example, for an SRS resource having no relationship such as the SRS resource #1 1515, when the SRS is transmitted (or triggered), the SRS may be transmitted as a non-precoded SRS or a wide band SRS. Furthermore, although in an embodiment one the CSI-RS resource and the one SRS resource have a relationship with each other, the disclosure is not limited thereto, and a plurality of CSI-RS resources may have a relationship with one SRS resource or one CSI-RS resource may have a relationship with a plurality of SRS resources. Furthermore, in an embodiment, some of the code points indicating relationships may include an indicator that determines whether to use the relationship.

Figure 16:
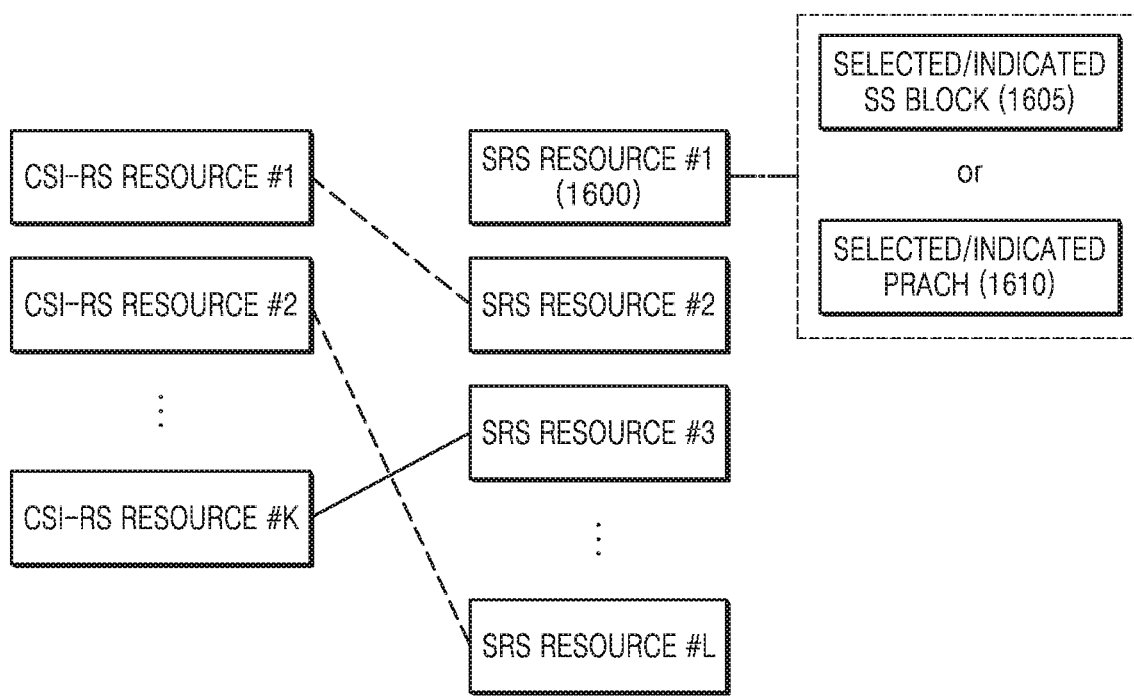
FIG. 16 illustrates a relationship according to another embodiment.

FIG. 16 illustrates a relationship according to another embodiment.

In FIG. 16, redundant descriptions in FIG. 15 are briefly presented.

In the embodiment of FIG. 16, the BS may configure and indicate various types of relationships to the UE. For example, the BS may transmit to the UE not only information about a relationship between the CSI-RS and the SRS, but also information about a relationship between an SSB 1605 or a PRACH 1610, and an SRS. Accordingly, the UE may variously adjust an SRS beam direction or a beam width and reduce a change in the performance according to an environment by reducing adjustment dependency on the SRS beam and/or precoding with respect to a specific reference signal or channel. In this state, the SSB 1605 having a relationship with the SRS may be selected according to the indication/configuration of an SSB index report preferred by the UE or an SSB index of the BS. Furthermore, the PRACH 1610 having a relationship with the SRS may be selected in response to the PRACH of the BS.

The relationship may be signaled to the UE by various methods. In an embodiment, the relationship may be signaled based on independent CRI or SSB index and SRI. For example, when the SSB index indicated by the L1 signaling or upper layer signaling indicates the specific SSB 1605 and the SRI dynamically indicated by the DCI or MAC CE indicates an SRS resource #1 1600, the two CSI-RS resource and SRS resources may be determined to have a relationship with each other. In an embodiment, a relationship between the CSI-RS and the SRS may be predetermined through the upper layer signaling, and part of the relationship may be activated through the L1 signaling.

In an embodiment, all SRS resources do not necessarily have relationships. In other words, for an SRS resource having no relationship, when the SRS is transmitted (or triggered), the SRS may be transmitted as a non-precoded SRS or a wide band SRS. Furthermore, although in an embodiment one CSI-RS resource and one SRS resource have a relationship with each other, the disclosure is not limited thereto and a plurality of CSI-RS resources may have a relationship with one SRS resource or one CSI-RS resource may have a relationship with a plurality of SRS resources. Furthermore, in an embodiment, some of the code points indicating relationships may include an indicator that determines whether to use the relationship.

Figure 17:
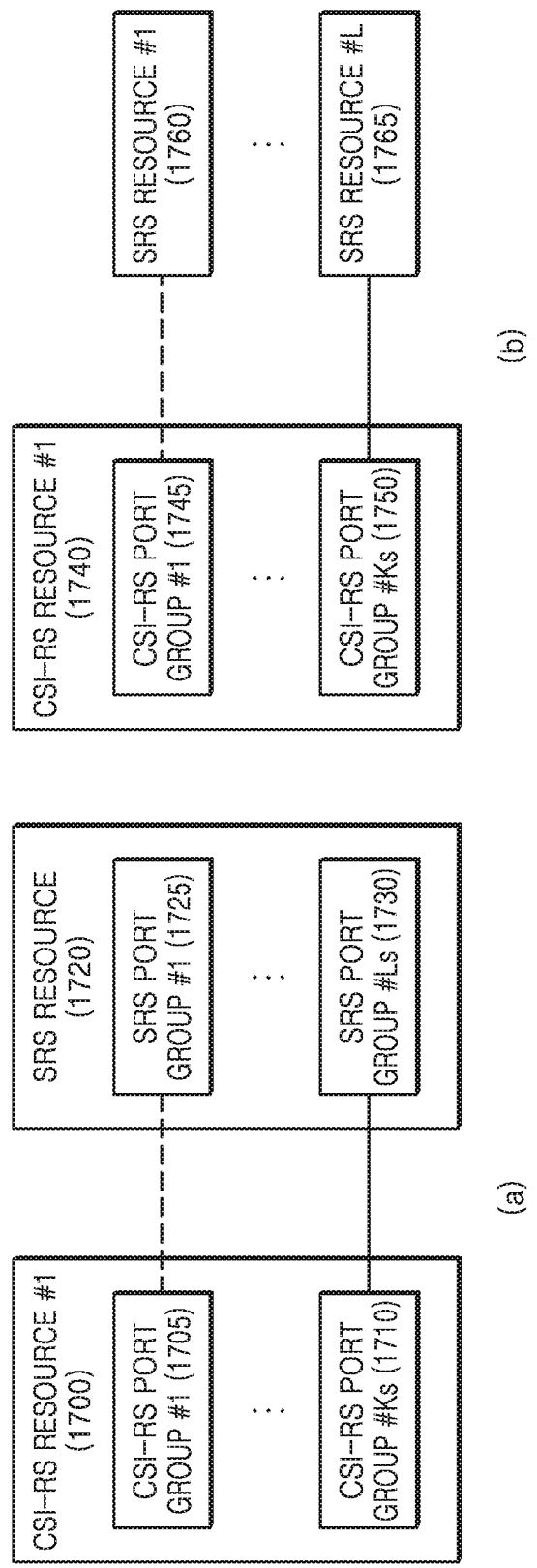
FIG. 17 illustrates a relationship according to another embodiment.

FIG. 17 illustrates a relationship according to another embodiment.

Although FIG. 17 illustrates the relationship of a DL-UL reference signal or channel as an example of a method for implicit SRS beam and/or precoding indication, this is a mere embodiment, and various embodiments such as a relationship between UL-UL reference signals or channels may be employed. Referring to FIG. 17(*a*), to indicated various beam directions, the BS may configure to the UE CSI-RS resources 1700 consisting of one or more CSI-RS port groups 1705 and 1710 and an SRS resource 1720 consisting of one or more SRS port groups 1725 and 1730. The BS may transmit to the UE information about a relationship between a specific CSI-RS port group and a specific SRS port group.

Referring to FIG. 17(*b*), the CSI-RS port group and the SRS port group may include one or more CSI-RS ports or SRS ports, respectively. In this state, there is no need to apply a relationship of a port group level to both of reference signals, and a relationship of a resource level may be applied to one reference signal. For example, CSI-RS port groups #1 1745 and #2 1750 in a CSI-RS resource #1 1740 may have relationships with an SRS resource #1 1760 and an SRS resource #2 1765, respectively.

Figure 18:
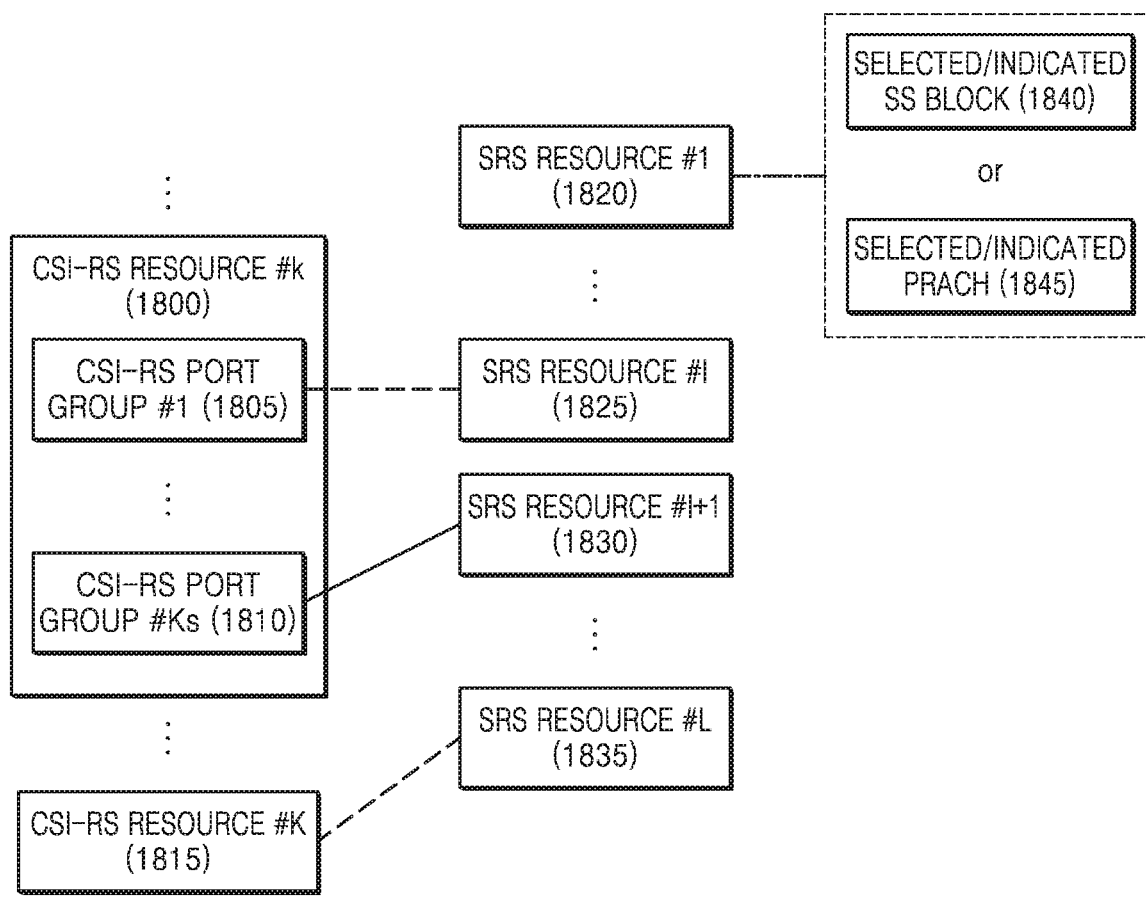
FIG. 18 illustrates a relationship according to another embodiment.

FIG. 18 illustrates a relationship according to another embodiment.

Although FIG. 18 illustrates an example of a relationship of DL-UL signal/channels as a method for implicit SRS beam and/or precoding indication, this is a mere embodiment, and various embodiments such as a relationship between UL-UL signals/channels may be employed. Referring to FIG. 18, to indicate various beam directions, the BS may configure to the UE CSI-RS resources 1800 consisting of one or more CSI-RS port groups 1805 and 1810 and one or more SRS resources 1820, 1825, 1830, and 1835. The BS may transmit to the UE information about a relationship between a specific CSI-RS port group and a specific SRS port group. In an embodiment, some SRS resources or SRS port groups may have a relationship with other reference signal and channel such as an SSB 1840 or a PRACH 1845 other than the CSI-RS. In this state, the SSB 1840 having a relationship with the SRS may be selected according to the indication/configuration of the SSB index report preferred by the UE or an SSB index of the BS. Furthermore, the PRACH 1610 having a relationship with the SRS may be selected in response to the PRACH of the BS.

In an embodiment, the CSI-RS port group and the SRS port group may include one or more CSI-RS ports or SRS ports. In this state, a relationship of a port group level is not necessarily applied to both reference signals, and a relationship of a resource level may be applied to one reference signal.

Figure 19:
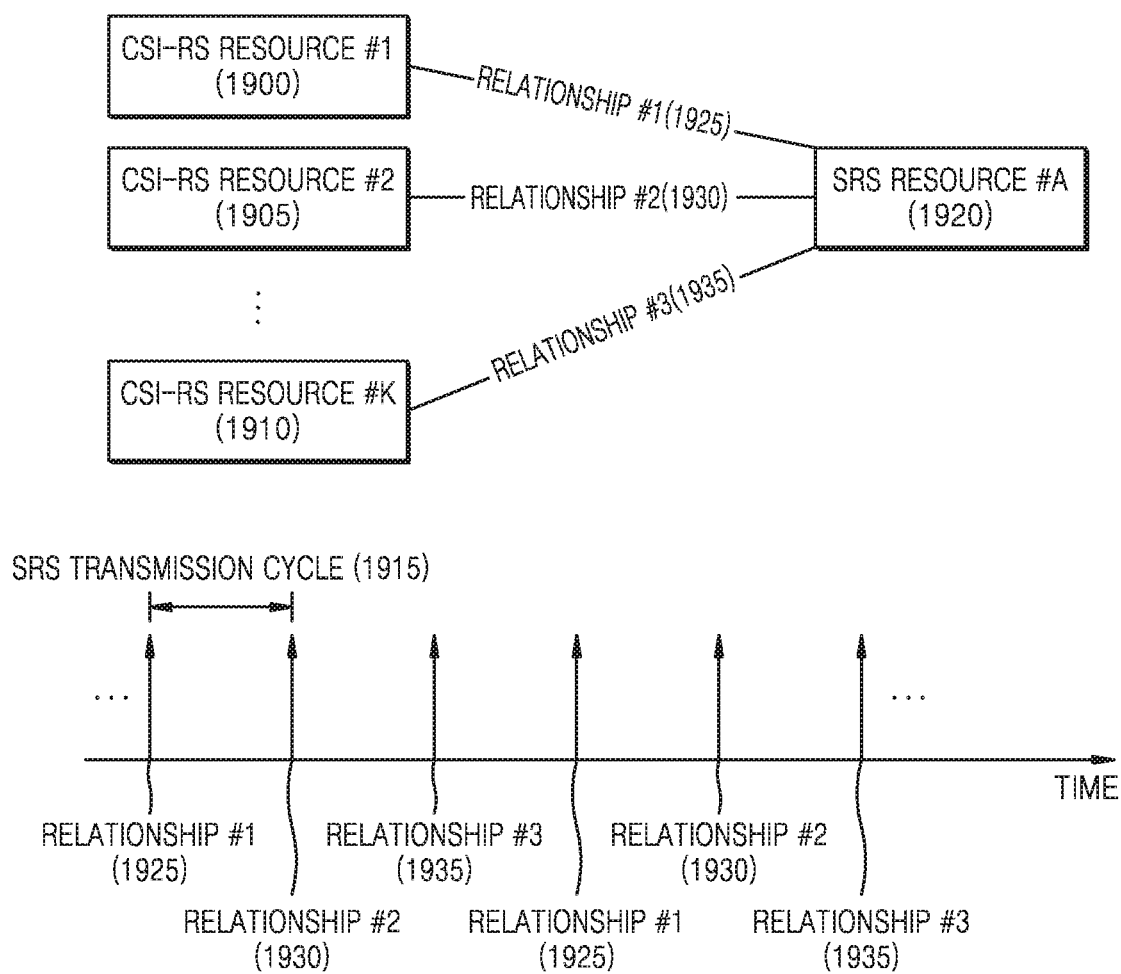
FIG. 19 illustrates a method of configuring the direction of a beam to be used for transmission of an uplink reference signal based on periodic SRS or semi-persistent SRS, according to an embodiment.

FIG. 19 illustrates a method of configuring the direction of a beam to be used for transmission of a UL reference signal based on periodic SRS or semi-persistent SRS, according to an embodiment.

Although in FIG. 19 a relationship between DL-UL signals/channels is presented as an example of a method for implicit SRS beam and/or precoding indication, this is a mere embodiment, and various embodiments such as a relationship between UL-UL signals/channels or explicit indication may be employed. Referring to FIG. 19, the BS may configure to the UE one or more CSI-RSs 1900, 1905, and 1910, the CSI-RSs 1900, 1905, and 1910 having relationships 1925, 1930, and 1935 with one SRS resource 1920. This means that one SRS resource may be related to various beam and/or precoding directions. A periodic SRS or a semi-persistent SRS has a plurality of transmission timings that are determined by a configured transmission cycle 1915 and offset. Accordingly, various beam and/or precoding directions indicated by a plurality of relationships may be applied by being divided at different transmission timings. For example, a relationship #1 may be applied to the first transmission timing 1925 of the SRS resource #A 1920, a relationship #2 may be applied to the second transmission timing 1930, and a relationship #3 may be applied to the third transmission timing 1935. Then, a relationship may be cyclically applied in the transmission timing. Although in FIG. 19 the descriptions are presented at an SRS resource level for convenience of explanation, the embodiment illustrated in FIG. 19 may be applied to an SRS port group level.

Figure 20:
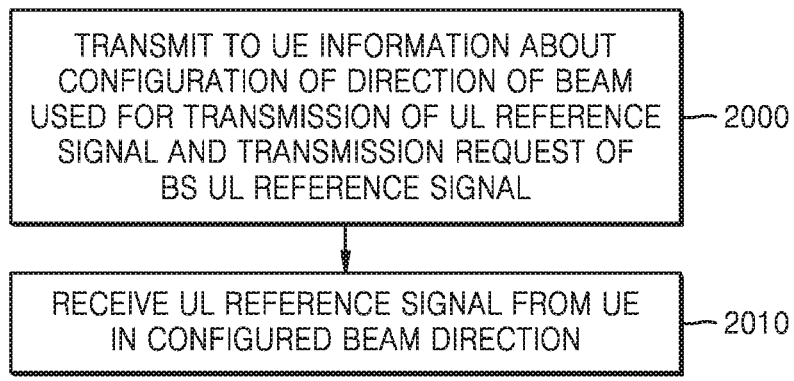
FIG. 20 is a flowchart of a method of receiving a reference signal or channel of a base station, according to an embodiment.

FIG. 20 is a flowchart of a method of receiving a reference signal or channel of a base station, according to an embodiment.

In operation 2000, the BS transmits to the UE information about the direction of a beam used for the transmission of a UL reference signal or channel. In this case, as the number of resources allocated to the DL or UL reference signal increases, L1 signaling overhead may be much increased. Accordingly, a method to reduce the L1 signaling overhead is necessary.

In an embodiment, the BS may configure at least some of the resources allocated to the UL reference signal or channel to be deactivated, and may transmit to the UE information about the deactivated resources. In detail, the BS may apply activation/deactivation to some resources of the DL UL reference signal resources configured by RRC or MAC CE. In this case, each of code points of an SRS request field in L1 signaling may be limited to include only the activated DL or UL reference signal.

In an embodiment, the BS may configure a reference point based on channel status information previously received from the UE, and may transmit to the UE the information about the direction of a beam by using the reference point and a difference value from the reference point. In detail, the BS may configure a reference point of a beam direction according to the CSI that is previously reported by the UE, and may indicate a UL beam and/or precoding direction by using the difference value from the reference point. In this state, the CSI that is previously reported by the UE may include CRI, RI, or PMI.

A precoder in the form of a DFT vector/matrix that is the same as the form described above in Equation 1 to Equation 5 may quantize all angles to 0-2 pi in the maximum two dimensions. In an embodiment, the BS may indicate some of N-number of TPMIs (or TBIs) v1, v2, . . . , vN that may be indicated. In this case, as the payload of an indicator for the indication is $\lceil \log_2 \rceil$, and as the number of available TPMIs increases, signaling overhead may be increased. When the indicator for the indication is reduced to 2 bits, each of code points {00, 01, 10, 11} of the indicator may be promised to indicate each of {vi, vi+a, vi+b, vi+c}. In this state, vi may be promised to be one of a precoding vector corresponding to the last PMI reported by the UE, a direction indicated by the last reported PMI, a beam used to receive a CSI-RS corresponding to the last reported CRI, and a beam direction used to receive the CSI-RS corresponding to the last reported CRI. The other {vi+a, vi+b, vi+c} may be promised to be one of three precoding vectors adjacent to (or within/in a predetermined distance/direction) the center (reference) of vi, a direction indicated by the PMI, a beam used to receive the CSI-RS, and a receiving beam direction for CSI-RSs included in a CSI-RS resource set including vi. In other words, the BS may reduce the payload needed for configurations of the UL reference signal beam and/or precoding direction from $\lceil \log_2 \rceil$ to 2 bits based on the entirety or part of the CRI/RI/PMI previously reported by the UE. In this state, for convenience of explanation, the payload of the indicator is described to be 2 bits, this is a mere embodiment, and the disclosure may be variously modified. For example, the above-described embodiment may be applied to a payload of 3 bits or more.

In an embodiment, the BS may transmit the DL reference signal, and may change the information about the direction of a beam based on the report by the UE on the DL reference signal.

Then, in operation 2010, the BS may receive the UL reference signal or channel from the UE in the above-configured direction of a beam.

Figure 21:
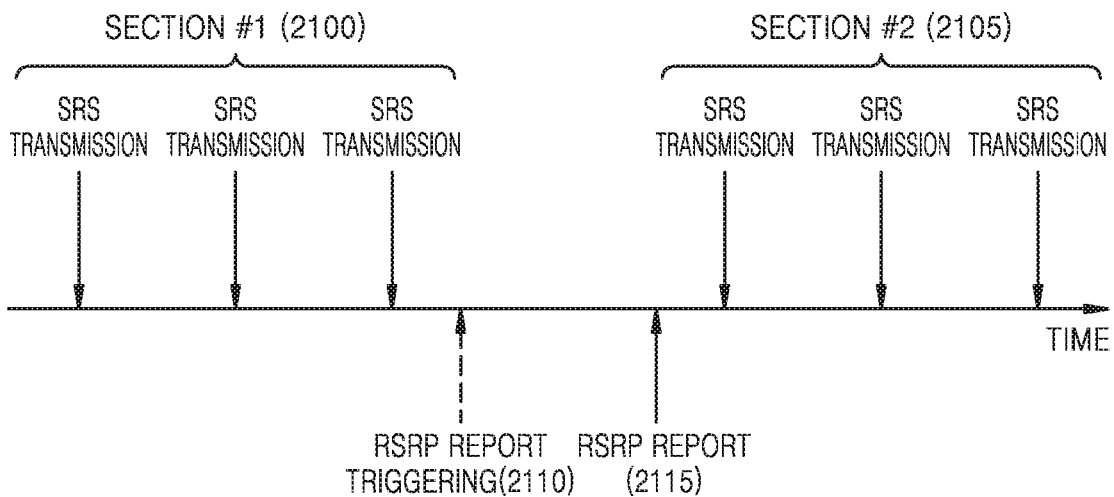
FIG. 21 illustrates a method of configuring the direction of a beam to be used for transmission of an uplink reference signal or channel according to a report of user equipment, according to an embodiment.

FIG. 21 illustrates a method of configuring the direction of a beam to be used for transmission of a UL reference signal according to a report of the UE, according to an embodiment.

Referring to FIG. 21, the meaning of a relationship of one or more DL-UL reference signals or channels or a relationship of UL-UL reference signals or channels configured by the L1 signaling or the upper layer signaling may be flexibly changed according to a CSI or RSRP report of the UE. For example, when the BS operates based on an RSRP report of the UE, and a payload of a relationship indicator is 2 bits, available four code points may be promised to have the following meanings.

code point 00: a non-precoded (or wide beam) SRS (SRS resource #1)

code point 01: a relationship (SRS resource #2) with a DL reference signal or channel, that is, CSI-RS or SSB, having the largest RSRP code point 10: a relationship (SRS resource #3) with a DL reference signal or channel, that is, CSI-RS or SSB, having the second largest RSRP code point 11: a relationship (SRS resource #4) with a DL reference signal or channel, that is, CSI-RS or SSB, having the third largest RSRP In this state, the order of the reported RSRPs may be changed according to a change in the channel state of the UE or time, and thus the meaning of the connection relationship indicated by the respective code points may be changed. For example, when, in an interval #1 (2100), the RSRP report is triggered by a specific condition such as the upper layer, the L1 signaling, or handover, and in an interval #2 (2105), the RSRPs are reported and updated, a CSI-RS or SSB list having the largest RSRP, the second largest RSRP, and the third largest RSRP in the interval #1 (2100) and a CSI-RS or SSB list having the largest RSRP, the second largest RSRP, and the third largest RSRP in the interval #2 (2105) may be different from each other. Accordingly, the connection relationship considered in the SRS transmission in the interval #1 and the connection relationship considered in the SRS transmission in the interval #2 may differ from each other. The BS may adaptively change the connection relationship according to the channel state change, without much concern about signaling, by using the above characteristics.

Figure 22:
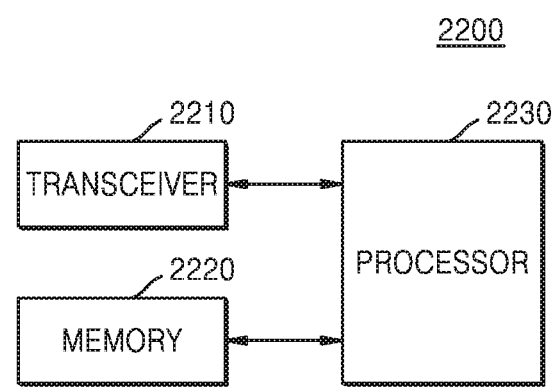
FIG. 22 is a block diagram of an internal structure of a user equipment, according to an embodiment.

FIG. 22 is a block diagram of an internal structure of the UE, according to an embodiment.

Referring to FIG. 22, a UE 2200 may include a transceiver 2210, a memory 2220, and a processor 2230. The transceiver 2210, the memory 2220, and the processor 2230 of the UE 2200 may be operated according to the communication method of the UE 2200. However, the constituent elements of the UE 2200 are not limited to the above-described example. For example, the UE 2200 may include constituent elements more or less than the above-described constituent elements. In addition, the transceiver 2210, the memory 2220, and the processor 2230 may be implemented in the form of one chip.

The transceiver 2210 may transmit signals to or receive signals from the BS. The signals may include control information and data. To this end, the transceiver 2210 may include an RF transmitter for up-converting and amplifying the frequency of a signal to be transmitted and an RF receiving for low-noise amplifying received signals and down-converting the frequency thereof. However, this is a mere embodiment of the transceiver 2210, and the constituent elements of the transceiver 2210 are not limited to the RF transmitter and the RF receiver.

Furthermore, the transceiver 2210 may receive signals through a wireless channel and output the received signals to the processor 2230, and transmit the signals output from the processor 2230 through the wireless channel.

The memory 2220 may store programs and data needed for the operation of the UE 2200. Furthermore, the memory 2220 may store control information or data included in the signals obtained from the UE 2200. The memory 2220 may consist of storage medium such as ROM, RAM, hard disks, CD-ROM, and DVD, or a combination of the storage media. Furthermore, the memory 2220 may include a plurality of memories. In an embodiment, the memory 2220 may store programs for transmission of UL reference signals or channels.

The processor 2230 may control a series of processes so that the UE 2200 is operated according to the above-described embodiment. The processor 2230 may include a plurality of processors. In an embodiment, the processor 2230 may receive from the BS information about the direction of a beam used for the transmission of a UL reference signal or channel, by performing the programs stored in the memory 2220, and may perform beamforming on the UL reference signal or channel based on the information about the direction of a beam and transmit the beamformed UL reference signal or channel to the BS.

Figure 23:
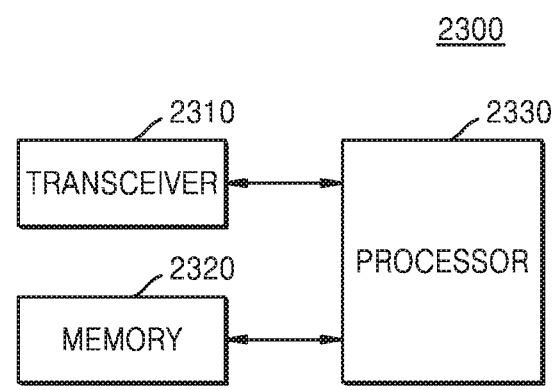
FIG. 23 is a block diagram of an internal structure of a base station according to an embodiment.

FIG. 23 is a block diagram of an internal structure of a BS according to an embodiment.

Referring to FIG. 23, the BS 2300 may include a transceiver 2310, a memory 2320, and a processor 2330. The transceiver 2310, the memory 2320, and the processor 2330 of the BS 2300 may be operated according to the above-described communication method of the BS 2300. However, the constituent elements of the BS 2300 are not limited to the above-described example. For example, the BS 2300 may include constituent elements more or less than the above-described constituent element. In addition, the transceiver 2310, the memory 2320, and the processor 2330 may be implemented in the form of one chip.

The transceiver 2310 may transmit signals to or receive signals from the UE. The signals may include control information and data. To this end, the transceiver 2310 may include an RF transmitter for up-converting and amplifying the frequency of a signal to be transmitted and an RF receiving for low-noise amplifying received signals and down-converting the frequency thereof. However, this is a mere embodiment of the transceiver 2310, and the constituent elements of the transceiver 2310 are not limited to the RF transmitter and the RF receiver.

Furthermore, the transceiver 2310 may receive signals through a wireless channel and output the received signals to the processor 2330, and transmit the signals output from the processor 2330 through the wireless channel.

The memory 2320 may store programs and data needed for the operation of the BS 2300. Furthermore, the memory 2320 may store control information or data included in the signals obtained from the BS 2300. The memory 2320 may consist of storage medium such as ROM, RAM, hard disks, CD-ROM, and DVD, or a combination of the storage media. Furthermore, the memory 2320 may include a plurality of memories. In an embodiment, the memory 2320 may store programs for transmission of UL reference signals or channels.

The processor 2330 may control a series of processes so that the BS 2300 is operated according to the above-described embodiment. The processor 2330 may transmit to the UE information about the direction of a beam used for the transmission of a UL reference signal or channel, by performing the programs stored in the memory 2320, and may receive from the UE the UL reference signal or channel in the above-configured direction of a beam.

The embodiments of the disclosure disclosed in the present specification and the drawings present a specific example to easily describe the technical matter of the disclosure and help understanding of the disclosure, not limiting the scope of the disclosure. In other words, it is obvious to those of ordinary skill in the field of technology to which the disclosure belongs that other variations are possible based on the technical idea of the disclosure. Furthermore, the above respective embodiments may be combined with each other as necessary for operation. For example, as parts of an embodiment and another embodiment of the disclosure are combined with each other, the BS and the UE may be operated. Furthermore, although the embodiments are presented based on an FDD LTE system, other modified examples based on the technical concept of the embodiment may be possible for other systems such as a TDD LTE system or a 5G or NR system.

The invention claimed is:

1. A method, performed by a user equipment, of transmitting an uplink reference signal or channel in a wireless communication system, the method comprising:
receiving, from a base station through radio resource control (RRC) signaling, information indicating one of implicit precoding or explicit precoding and information configuring a plurality of sounding reference signal (SRS) resources, wherein the plurality of SRS resources are related with one channel state information-reference signal (CSI-RS) resource;
acquiring an SRS resource indicator (SRI) in downlink control information (DCI) received through a physical control channel, wherein the SRI indicates at least one SRS resource from among the plurality of SRS resources;
based on the implicit precoding being indicated, obtaining precoding information for the uplink channel based on the CSI-RS resource related with a most recently transmitted SRS of the at least one SRS resource indicated by the SRI; and
transmitting, to the base station, the uplink channel based on the precoding information.

2. The method of claim 1, wherein obtaining the precoding information for the uplink channel includes:
obtaining precoding information for the SRS resource based on the CSI-RS resource related with the SRS resource indicated by the SRI; and
obtaining the precoding information for the uplink channel based on the precoding information for the SRS resource.

3. The method of claim 2, further comprising:
transmitting a SRS based on the precoding information for the SRS resource.

4. The method of claim 1, further comprising:
based on the explicit precoding being indicated, transmitting, to the base station, the uplink channel based on a codebook,
wherein the explicit precoding includes using a precoding matrix indicator (TPMI).

5. A method, performed by a base station, of receiving an uplink channel in a wireless communication system, the method comprising:
transmitting, to a user equipment through radio resource control (RRC) signaling, information indicating one of implicit precoding or explicit precoding and information configuring a plurality of sounding reference signal (SRS) resources, wherein the plurality of SRS resources are related with one channel state information-reference signal (CSI-RS) resource; and
receiving, from the user equipment, the uplink channel based on precoding information for the uplink channel,
wherein, based on the implicit precoding being indicated, the precoding information for the uplink channel is obtained based on the CSI-RS resource related with a most recently transmitted SRS of at least one SRS resource indicated from among the plurality of SRS resources by an SRS resource indicator (SRI) in downlink control information (DCI) transmitted through a physical control channel.

6. A user equipment for transmitting an uplink channel in a wireless communication system, the user equipment comprising:
at least one memory storing a program to transmit the uplink channel; and
at least one processor, by performing the program, configured to:
receive, from a base station through radio resource control (RRC) signaling, information indicating one of implicit precoding or explicit precoding and information configuring a plurality of sounding reference signal (SRS) resources, wherein the plurality of SRS resources are related with one channel state information-reference signal (CSI-RS) resource,
acquire an SRS resource indicator (SRI) in downlink control information (DCI) received through a physical control channel, wherein the SRI indicates at least one SRS resource from among the plurality of SRS resources, based on the implicit precoding being indicated, obtain precoding information for the uplink channel based on the CSI-RS resource related with a most recently transmitted SRS of the at least one SRS resource indicated by the SRI, and transmit, to the base station, the uplink channel based on the precoding information.

7. The user equipment of claim 6, wherein the at least one processor is configured to:

obtain precoding information for the SRS resource based on the CSI-RS resource related with the SRS resource indicated by the SRI, and obtain the precoding information for the uplink channel based on the precoding information for the SRS resource.

8. The user equipment of claim 7, wherein the at least one processor is further configured to:

transmit a SRS based on the precoding information for the SRS resource.

9. The user equipment of claim 6, wherein the at least one processor is further configured to:

based on the explicit precoding being indicated, transmit, to the base station, the uplink channel based on a codebook, wherein the explicit precoding includes using a precoding matrix indicator (TPMI).

10. A base station for receiving an uplink channel in a wireless communication system, the base station comprising:

at least one memory storing a program to receive the uplink channel; and a processor, by performing the program, configured to:

transmit, to a user equipment through radio resource control (RRC) signaling, information indicating one of implicit precoding or explicit precoding and information configuring a plurality of sounding reference signal (SRS) resources, wherein the plurality of SRS resources are related with one channel state information-reference signal (CSI-RS) resource; and receive, from the user equipment, the uplink channel based on precoding information for the uplink channel, wherein, based on the implicit precoding being indicated, the precoding information for the uplink channel is obtained based on the CSI-RS resource related with a most recently transmitted SRS of at least one SRS resource indicated from among the plurality of SRS resources by an SRS resource indicator (SRI) in downlink control information (DCI) transmitted through a physical control channel.

* * * * *